US011125301B1

(12) United States Patent
Guan et al.

(10) Patent No.: US 11,125,301 B1
(45) Date of Patent: Sep. 21, 2021

(54) CIRCULAR WAVE DRIVE

(71) Applicant: Circular Wave Drive Partners Inc., Columbus, OH (US)

(72) Inventors: Shan Guan, Dublin, OH (US); Luc To, Columbus, OH (US)

(\*) Notice: Subject to any disclaimer, the term of this patent is extended or adjusted under 35 U.S.C. 154(b) by 0 days.

(21) Appl. No.: 16/900,923

(22) Filed: Jun. 14, 2020

Related U.S. Application Data

(60) Provisional application No. 63/002,596, filed on Mar. 31, 2020, provisional application No. 63/007,556, filed on Apr. 9, 2020.

(51) Int. Cl.
*F16H 1/32* (2006.01)

(52) U.S. Cl.
CPC ......... *F16H 1/32* (2013.01); *F16H 2001/327* (2013.01)

(58) Field of Classification Search
CPC .............................. F16H 1/32; F16H 2001/327
See application file for complete search history.

(56) References Cited

U.S. PATENT DOCUMENTS

| 3,196,713 | A | 7/1965 | Robinson |
|---|---|---|---|
| 3,211,400 | A | 10/1965 | Booth |
| 3,214,999 | A | 11/1965 | Lapp |
| 3,459,072 | A | 8/1969 | Shannon |
| 4,604,916 | A | 8/1986 | Distin, Jr. |
| 4,674,351 | A | 6/1987 | Byrd |
| 4,841,810 | A | 6/1989 | Lew |
| 4,884,473 | A | 12/1989 | Lew |
| 5,101,678 | A | 4/1992 | Inui |
| 5,145,468 | A | 9/1992 | Nagabhusan |

(Continued)

FOREIGN PATENT DOCUMENTS

| CN | 2326784 Y | 6/1999 |
|---|---|---|
| CN | 99111768 A | 2/2001 |

(Continued)

OTHER PUBLICATIONS

International Search Report and Written Opinion in related application PCT/US20/37651, dated Sep. 1, 2020.

(Continued)

*Primary Examiner* — David J Hlavka
(74) *Attorney, Agent, or Firm* — Kern Kendrick, LLC; Thomas Y. Kendrick; Benjamen E. Kern

(57) ABSTRACT

A circular wave drive system is provided. In one aspect, the drive comprises: a compliant input ring gear, wherein input ring gear includes internal input ring gear teeth; an input cycloidal disc having an outer surface, wherein the input cycloidal disc includes external input cycloidal disc gear teeth, and wherein the external gear teeth engage the internal gear teeth; a compliant primary drive gear having an outer surface, wherein the primary drive gear includes external primary drive gear teeth; an eccentric motion generator having an eccentric portion and a non-eccentric portion and wherein a centerline of the eccentric portion and the non-eccentric portion are offset, and wherein the eccentric motion generator includes a hollow central bore; and an output cycloidal disc, wherein the output cycloidal disc includes internal output cycloidal disc teeth, and wherein the internal output cycloidal disc teeth engage the external primary drive gear teeth.

19 Claims, 25 Drawing Sheets

(56) References Cited

U.S. PATENT DOCUMENTS

| | | | |
|---|---|---|---|
| 5,470,283 A * | 11/1995 | Seidou | F16H 1/32 464/103 |
| 5,716,300 A | 2/1998 | Sammataro et al. | |
| 5,820,504 A | 10/1998 | Geralde | |
| 6,664,711 B2 | 12/2003 | Baudendistel | |
| 6,736,028 B2 | 5/2004 | Ruttor et al. | |
| 7,235,030 B2 | 6/2007 | Becker et al. | |
| 7,479,083 B2 | 1/2009 | Schmidt et al. | |
| 7,552,664 B2 | 6/2009 | Bulatowicz | |
| 7,673,598 B2 | 3/2010 | Schaefer et al. | |
| 8,562,475 B2 * | 10/2013 | Sato | F16H 1/32 475/178 |
| 9,003,924 B2 | 4/2015 | Kanai | |
| 9,321,595 B2 | 4/2016 | Wolters et al. | |
| 9,400,035 B1 | 7/2016 | Edsinger et al. | |
| 9,490,679 B2 | 11/2016 | Yamamoto et al. | |
| 9,523,410 B2 | 12/2016 | Lohmann et al. | |
| 9,657,813 B2 | 5/2017 | Tesar | |
| 9,695,912 B2 | 7/2017 | Edsinger et al. | |
| 9,808,357 B2 | 11/2017 | Langlois | |
| 9,829,071 B2 | 11/2017 | Nakamura et al. | |
| 9,869,383 B2 | 1/2018 | Sasaki | |
| 9,874,300 B2 | 1/2018 | Hagen et al. | |
| 9,919,875 B2 | 3/2018 | Paulides et al. | |
| 10,190,666 B2 | 1/2019 | Noguchi et al. | |
| 10,415,672 B2 | 9/2019 | Salisbury | |
| 10,422,414 B2 | 9/2019 | Ho et al. | |
| 10,513,029 B2 | 12/2019 | Krumbacher et al. | |
| 10,704,650 B2 | 7/2020 | Rey et al. | |
| 10,767,733 B2 | 9/2020 | Sun et al. | |
| 2006/0283289 A1 | 12/2006 | Baudendistel et al. | |
| 2011/0245030 A1 * | 10/2011 | Wakida | F16H 1/32 475/331 |
| 2012/0204674 A1 | 8/2012 | Lundberg et al. | |
| 2012/0235462 A1 * | 9/2012 | Yamamoto | B60K 7/0007 301/6.5 |
| 2013/0049508 A1 | 2/2013 | Willems | |
| 2015/0345607 A1 * | 12/2015 | Zheng | F16H 1/32 475/165 |
| 2015/0345608 A1 * | 12/2015 | Zheng | F16H 49/001 74/640 |
| 2016/0298746 A1 | 10/2016 | Kiyono et al. | |
| 2019/0047610 A1 | 2/2019 | Rey | |
| 2020/0011400 A1 | 1/2020 | Tory | |

FOREIGN PATENT DOCUMENTS

| | | |
|---|---|---|
| CN | 1616847 A | 5/2005 |
| CN | 206072245 U | 4/2017 |
| JP | 2011241974 A | 12/2011 |
| JP | 201927519 A | 2/2019 |
| WO | 2017/074478 A1 | 5/2017 |

OTHER PUBLICATIONS

International Search Report and Written Opinion in related application PCT/US15/33421, dated Aug. 21, 2015.

International Search Report and Written Opinion in related application PCT/US20/37652, dated Sep. 1, 2020.

Matt Freund, Bet You Can't Find a Use for This 11-Million-to-1 Gearbox, MAKE, published Jul. 8, 2015, acccessed online on Sep. 10, 2020 at https://makezine.com/2015/07/08/bet-cant-find-use-11-million-1-gearbox/.

Sumitomo Drive Technologies, Cyclo Drive 6000 Operating Manual, published 2019-08, accessed online on Sep. 10, 2020 at https://emeia.sumitomodrive.com/en-de/product/cyclo-drive-6000-gearmotor#documentation.

On Staff, Low backlash for the long haul, DesignNews, published Aug. 20, 2001, accessed online on Sep. 10, 2020 at https://www.designnews.com/low-backlash-long-haul.

* cited by examiner

600

610 Selecting a desired reduction ratio for the circular wave drive

620 Providing a circular wave drive including: an input ring gear having internal gear teeth (a); an input cycloidal disc having external gear teeth (b), the input cycloidal disc gear teeth at least partially engaging the input ring gear teeth; a primary drive gear having external gear teeth (d), the primary drive gear fixed to the input cycloidal disc; an output cycloidal disc having internal gear teeth (c), and the output cycloidal disc teeth at least partially engaging the primary drive gear teeth

630 Calculating a reduction ratio using the equation:
Reduction Ratio =
$$\left[ \frac{a}{b} \left( \frac{c-d}{c} \right) - \frac{a-b}{a} \right]^{-1} : 1$$

wherein the number of input ring gear teeth is (a),
wherein the number of input cycloidal gear teeth is (b),
wherein the number of output cycloidal disc teeth is (c),
wherein the number of primary drive gear teeth is (d).

FIG. 6

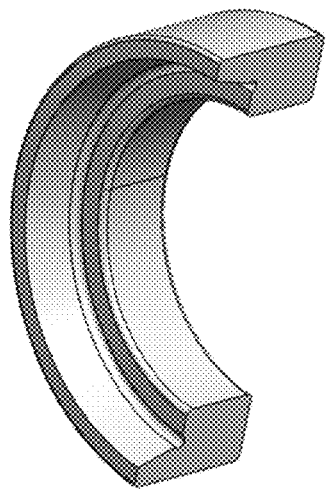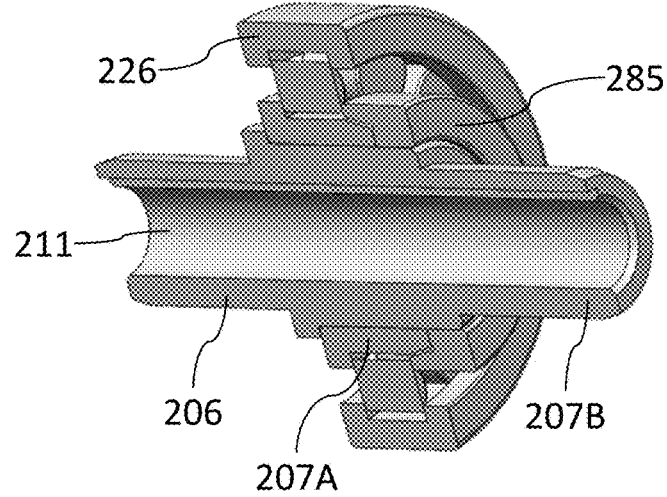
FIG. 10A
FIG. 10B

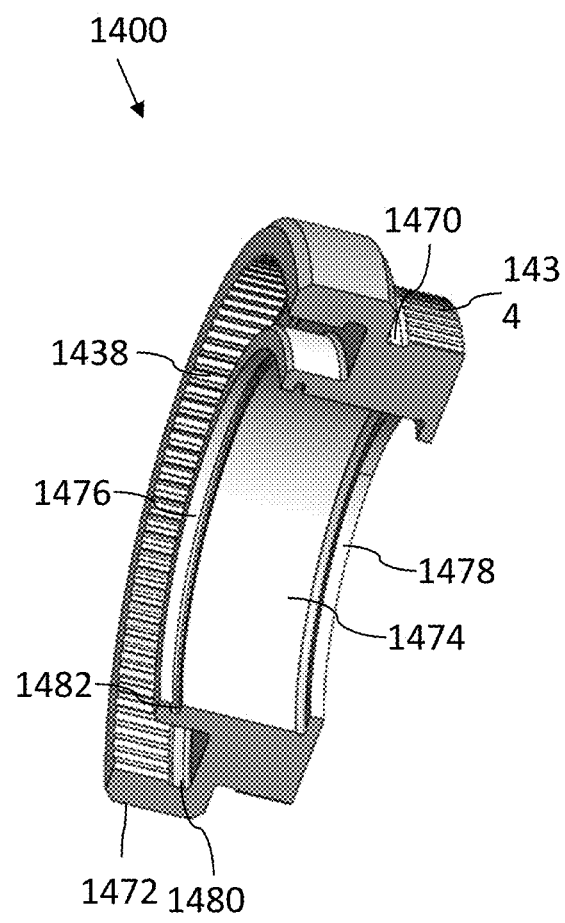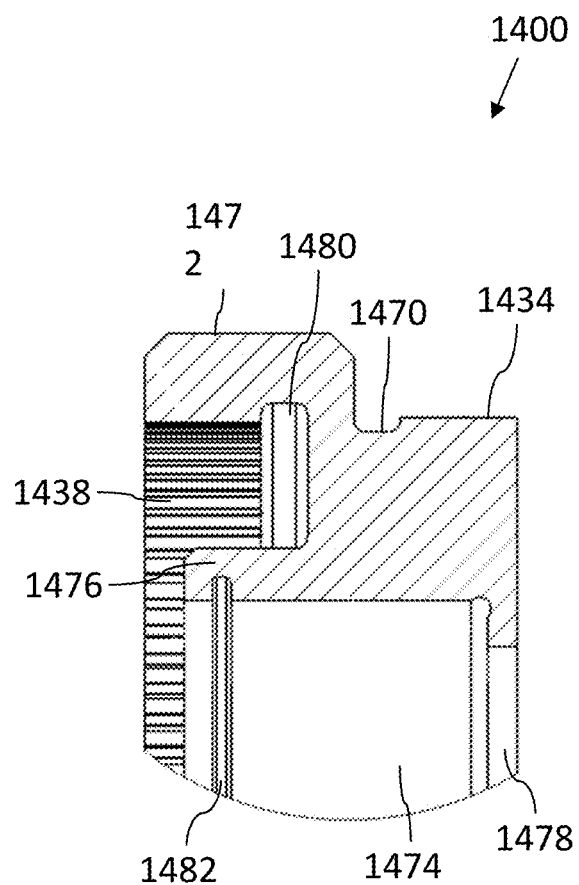
FIG. 14E
FIG. 14F

CIRCULAR WAVE DRIVE

CROSS-REFERENCE TO RELATED APPLICATIONS

This application claims priority to U.S. Provisional Patent Application No. 63/002,596, filed Mar. 31, 2020 and U.S. Provisional Patent Application No. 63/007,556, filed Apr. 9, 2020, each of which is incorporated by reference herein in its entirety.

BACKGROUND

A number of devices for transmitting power and reducing motor output speed are currently known. Two such devices are the harmonic drive and the cycloidal drive.

The more well-known of these devices is the harmonic drive, having been introduced in the 1950's and currently being in wide-spread use. However, the harmonic drive requires the use of a flexspine, which is deliberately deformed repeatedly during operation of the harmonic drive. This deformation of the flexspine fatigues the material from which the flexspine is constructed, which fatigue limits the speed reduction and torque transfer that may be achieved with a harmonic drive.

Typical versions of the cycloidal drive are of relatively complex construction and operation. The cycloidal drive requires many moving parts, each of which may be a point of failure. The eccentric rotation of the cycloidal disc also produces an undesirable vibration that may be transmitted through the input and output shafts if not compensated for. Finally, contact between the output rollers and the receiving holes in the cycloidal disc may also lead to the wear of both components.

Additionally, where toothed gears are utilized in the system to achieve the desired reduction ratios, gear backlash may be difficult to properly establish. As such, toothed elements with compliant (i.e., elastically deformable) gear portions may be included to permit the gear tooth interface to deflect slightly to obtain the necessary backlash for optimal functioning.

What is needed is a power transmission/speed reduction device that does not suffer from the described drawbacks of known harmonic and cycloidal drives. Such a device may also offer a more simplistic construction, as well as a long life.

SUMMARY

In one aspect, a circular wave drive is provided, the circular wave drive comprising: a compliant input ring gear having an inner surface, wherein the compliant input ring gear includes internal input ring gear teeth oriented on the inner surface; an input cycloidal disc having an outer surface, wherein the input cycloidal disc includes external input cycloidal disc gear teeth oriented on the outer surface, and wherein the external input cycloidal disc gear teeth at least partially engage the internal input ring gear teeth; a compliant primary drive gear having an outer surface, wherein the primary drive gear includes external primary drive gear teeth oriented on the outer surface; an eccentric motion generator, wherein the eccentric motion generator includes an eccentric portion and a non-eccentric portion and wherein a centerline of the eccentric portion and the non-eccentric portion are offset from one another, and wherein the eccentric motion generator includes a hollow central bore; and an output cycloidal disc having an inner surface, wherein the output cycloidal disc includes internal output cycloidal disc teeth oriented on the inner surface, and wherein the internal output cycloidal disc teeth at least partially engage the external primary drive gear teeth.

In another aspect, a circular wave drive is provided, the circular wave drive comprising: a compliant input ring gear having an inner surface, wherein the compliant input ring gear includes internal input ring gear teeth oriented on the inner surface, and wherein the compliant input ring gear includes a non-compliant portion containing the input ring gear teeth, and an input ring gear mounting flange, wherein the non-compliant portion and the input ring gear mounting flange are connected by a compliant wall; an input cycloidal disc having an outer surface, wherein the input cycloidal disc includes external input cycloidal disc gear teeth oriented on the outer surface, and wherein the external input cycloidal disc gear teeth at least partially engage the internal input ring gear teeth; a compliant primary drive gear having an outer surface, wherein the primary drive gear includes external primary drive gear teeth oriented on the outer surface, and wherein the primary drive gear includes a hub, a compliant wall extending axially and radially outwardly from the hub, and a relief groove, and wherein the relief groove separates the external primary drive gear teeth from the compliant wall; an eccentric motion generator, wherein the eccentric motion generator includes an eccentric portion and a non-eccentric portion and wherein a centerline of the eccentric portion and the non-eccentric portion are offset from one another, and wherein the eccentric motion generator includes a hollow central bore; and an output cycloidal disc having an inner surface, wherein the output cycloidal disc includes internal output cycloidal disc teeth oriented on the inner surface, and wherein the internal output cycloidal disc teeth at least partially engage the external primary drive gear teeth.

In one aspect, a circular wave drive is provided, the circular wave drive comprising: an input ring gear having an inner surface, wherein the input ring gear includes internal input ring gear teeth oriented on the inner surface; a monolithic combined input cycloidal disc and output cycloidal disc comprising: external input cycloidal gear teeth at least partially engaging the internal input ring gear teeth, internal output cycloidal gear teeth, a hollow center portion defined by a radially inner surface including an inner flange, and a radially inner wall extending radially inwardly from the radially inner surface, wherein the inner flange is radially inwardly of and axially overlapping with the internal output cycloidal gear teeth; a primary drive gear having an outer surface, wherein the primary drive gear includes external primary drive gear teeth oriented on the outer surface and at least partially engaging the internal output cycloidal gear teeth; an eccentric motion generator, wherein the eccentric motion generator includes an eccentric portion and a non-eccentric portion and wherein a centerline of the eccentric portion and the non-eccentric portion are offset from one another.

BRIEF DESCRIPTION OF THE DRAWINGS

The accompanying figures, which are incorporated in and constitute a part of the specification, illustrate various example systems, apparatuses, and methods, and are used merely to illustrate various example aspects. In the figures, like elements bear like reference numerals.

FIG. 6 is a flowchart illustrating an example method for determining a reduction radio of a circular wave drive.

FIG. 10A is a sectional perspective view of one example aspect of an angle ring 285.

FIG. 10B is a sectional perspective view of one example aspect of angle ring 285 assembled with an eccentric motion generator 206 and an eccentric motion generator/input cycloidal disc bearing 226.

FIG. 14E is a sectional perspective view of combined input and output cycloidal disc 1400.

FIG. 14F is a partial sectional perspective view of combined input and output cycloidal disc 1400.

DETAILED DESCRIPTION

Figure 1:
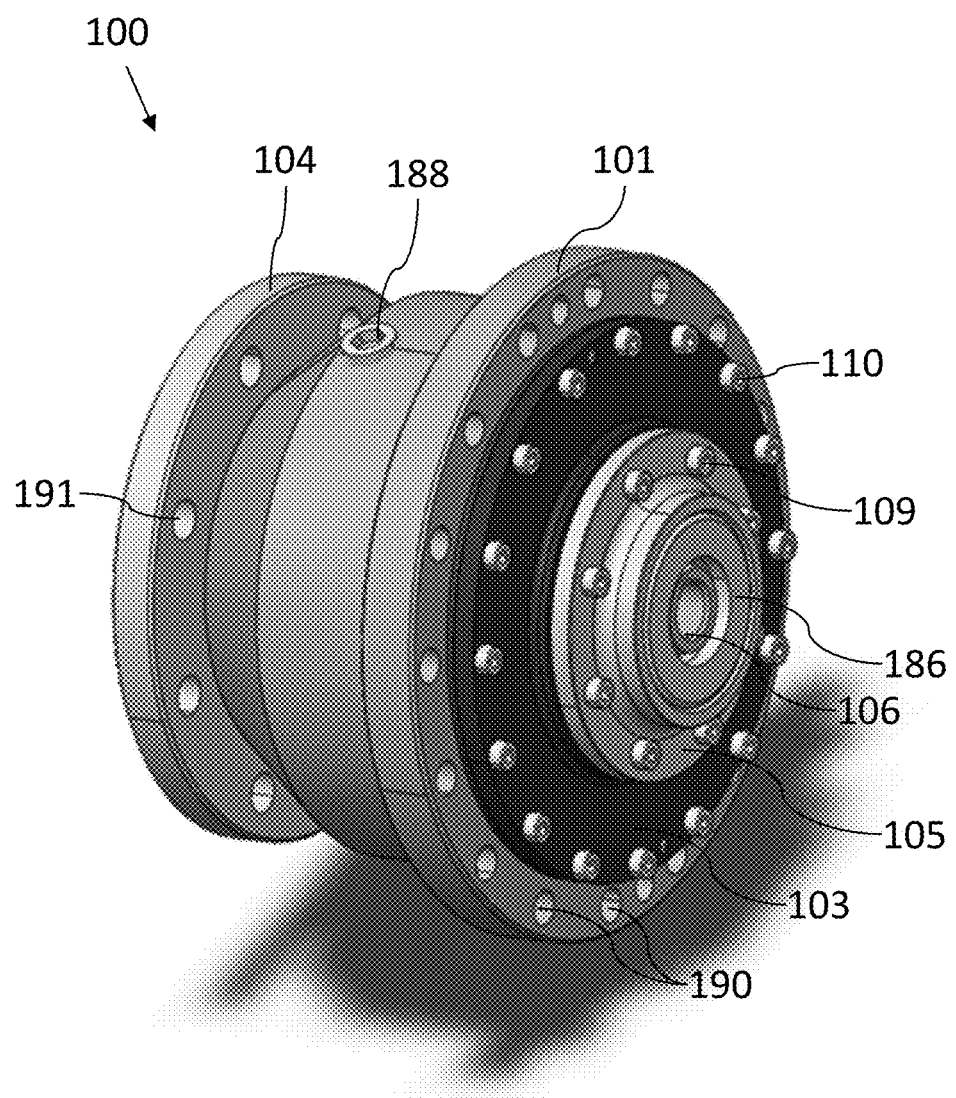
FIG. 1 is a perspective view of an input end of one example aspect of a circular wave drive 100.

Example circular wave drive aspects disclosed herein may be of simpler construction than known harmonic and cycloidal drives. Example circular wave drive aspects disclosed herein may also be compact in size, offer a large range of speed reduction ratios, are not reverse-drivable, and operate with little to no backlash. Example circular wave drive aspects disclosed herein are devoid of rollers commonly found in cycloidal drives.

Generally speaking, example circular wave drive aspects disclosed herein may include a housing having a circular chamber therein. The housing may include a cover that closes a cavity in the housing so as to form the enclosed circular chamber. The housing may be formed of more than one element, selectively fitted together. Teeth may be disposed along an inside circular wall of the chamber (input ring gear). A ring-shaped wheel (input cycloidal disc) may reside within the chamber. The ring-shaped wheel may be integral to, or removably attached to, the housing. The wheel may include external teeth that mesh with the teeth located along the circular inner wall of the housing. The wheel diameter may be smaller than the chamber diameter, such that only a portion of the wheel teeth are meshed with the internal housing teeth at any given time. The wheel may be laminated to a second wheel (primary drive gear), which may also include external teeth. The second wheel external teeth may mesh with internal teeth disposed along a portion of an inner wall of an output gear element (output cycloidal disc).

Example circular wave drive aspects disclosed herein may also include a wave generator (eccentric motion generator). The wave generator may include an eccentric motion generator having an eccentric portion configured to cause translation of one or more elements (e.g., input cycloidal disc and primary drive gear) during rotation of the eccentric motion generator. The eccentric motion generator, including the eccentric portion, may have a cross-section that is circular in shape. The eccentric portion may be offset from the central axis of the remainder of the eccentric motion generator so as to impart an eccentric motion to elements in contact with the eccentric motion generator when the eccentric motion generator is rotated. The non-eccentric portion of the wave generator may extend through an opening in the housing, which may include an input ring gear, either removably or integrally attached to the housing.

Example circular wave drive aspects may also employ an output drive element. The output drive element may include a circular-shaped disc. The output drive element may be coaxial with the eccentric motion generator. The output element portion may be oriented on an opposite side of the circular wave drive from the eccentric motion generator, or alternatively, the output element portion may be oriented on the same side of the circular wave drive as the eccentric motion generator. Both the eccentric motion generator and the output element portion of the output drive element may pass through bearings.

In operation, the eccentric motion generator of the wave generator may be connected to a rotation-imparting actuator, such as an electric drive motor. The actuator may impart rotational motion to the wave generator, which may cause the eccentric portion thereof to rotate within the input cycloidal disc and the primary drive gear. Rotation of the eccentric portion may cause a rotation of the input cycloidal disc along the inner wall of the input ring gear. Rotation of the eccentric portion and the input cycloidal disc may cause rotation of the output cycloidal disc, which may cause rotation of the primary drive gear, which may cause rotation of the output drive element at a reduced speed relative to the rotational velocity of the eccentric motion generator (reduced by the reduction ratio).

Because the external peripheral surface of the eccentric portion of the eccentric motion generator and the mating surface of the inner wall of the input cycloidal disc may be separated by a bearing, the coefficient of friction between the eccentric portion of the eccentric motion generator and the mating surface of the inner wall of the input cycloidal disc may be extremely low. Consequently, the input cycloidal disc may not rotate in turn with the eccentric motion generator eccentric portion but, rather, may slide along the peripheral surface of the eccentric motion generator eccentric portion. This may result in an input cycloidal disc rotational speed that is less than the rotational speed of the eccentric motion generator and associated actuator. The overall speed reduction between the input and output side of the circular wave drive may depend upon at least one of: the diameter of the wave generator, the number of gear teeth of the input cycloidal disc, the number of gear teeth of the input ring gear, the number of gear teeth of the primary drive gear, and the number of gear teeth of the output cycloidal disc. The overall speed reduction may additionally depend upon the diameters of the various elements noted immediately above. A large diameter may not necessarily have more teeth than a small diameter when two surfaces meet. With various combinations of the diameters and the numbers of teeth, the magnitude of the speed reduction may cover a large range, for example from 8:1 to 10,000:1, which may not be possible through the use of existing devices.

FIG. 1 illustrates one example aspect of a circular wave drive 100. Circular wave drive 100 may include a housing 101 and an output drive element 104. Circular wave drive 100 may include an eccentric motion generator 106.

Circular wave drive 100 may be configured to receive a rotational input and, via interactions between various elements, output a rotational output reduced by a reduction ratio as described further herein. Circular wave drive 100 may be made of any of a variety of materials, including for example: metals such as steel or alloys; polymers; or organic materials. Circular wave drive 100 may be made of any material having sufficient strength, hardness, or durability to perform a rotational reduction for a desired duration of intended use. Any of the various elements of circular wave drive 100 may be formed through any of a variety of methods, including for example: machining, 3D printing/additive manufacturing, or forging.

Housing 101 and output drive element 104 may be rotatably connected to one another, such that one may rotate relative to the other. Housing 101 and output drive element 104 may be rotatably connected to one another, with a primary drive gear/housing bearing (shown as element 268 in FIG. 2) oriented therebetween.

Housing 101 may include at least one port 188. Port 188 may be an opening in housing 101 selectively sealed by a plug. Port 188 may be used to add a lubricant to the interior of housing 101 so as to lubricate at least some moving components of circular wave drive 100. Port 188 may be used for ventilation to allow release of a pressure from within housing 101.

Circular wave drive 100 may include an end plate 103 connected to housing 101. End plate 103 may be connected to housing 101 via one or more fastener 110. Circular wave drive 100 may include a flange plate 105 encircling eccentric motion generator 106. Flange plate 105 may be connected to end plate 103 via one or more fastener 109.

A shaft lip seal 186 may encircle eccentric motion generator 106 and may be oriented between eccentric motion generator 106 and flange plate 105. Shaft lip seal 186 may act to retain a lubricant within housing 101, as further described below.

Eccentric motion generator 106 may be a shaft having a substantially annular cross-section, with a hollow central bore (described further below). Eccentric motion generator 106 may include an eccentric portion (shown as element 207A in FIG. 2) as described more fully below. Eccentric motion generator 106 may be operatively connected to a rotation-inducing element, including for example, a rotational actuator shaft (described further below) configured to impart rotation to eccentric motion generator 106.

Eccentric motion generator 106 is not directly connected to output drive element 104. That is, eccentric motion generator 106 and output drive element 104 are only connected to one another through intermediary gear train elements. Eccentric motion generator 106 and output drive element 104 rotate relative to one another pursuant to a reduction ratio, as further described below. In this manner, an input rotational speed is reduced by circular wave drive 100 and output through output drive element 104.

Either of housing 101 and end plate 103 may include any of a variety of elements permitting the mounting or otherwise arresting of housing 101 and/or end plate 103 relative to another object, such as a structural element of a mechanical component, the ground, a machine, and the like. Housing 101 may include one or more mounting apertures 190 oriented on a flange near the input end of circular wave drive 100. Apertures 190 may be used to fix housing 101 and circular wave drive 100 to another object and/or a stationary object. Apertures 190 may be configured to accept one or more fastener.

Output drive element 104 may include at least one output drive element mounting element 108. Output drive element mounting element 108 may include an aperture, perforation, boss, threaded blind hole, non-threaded blind hole, tab, and the like. Output drive element mounting element 108 may include any of a variety of elements permitting the mounting or otherwise arresting of output drive element 104 relative to another object, such as a structural element of a mechanical component, the ground, a machine, and the like. Output drive element 104 may include one or more mounting apertures 191. Apertures 191 may be used to fix output drive element 104 to another object and/or a stationary object. Apertures 191 may be configured to accept one or more fastener.

Figure 2:
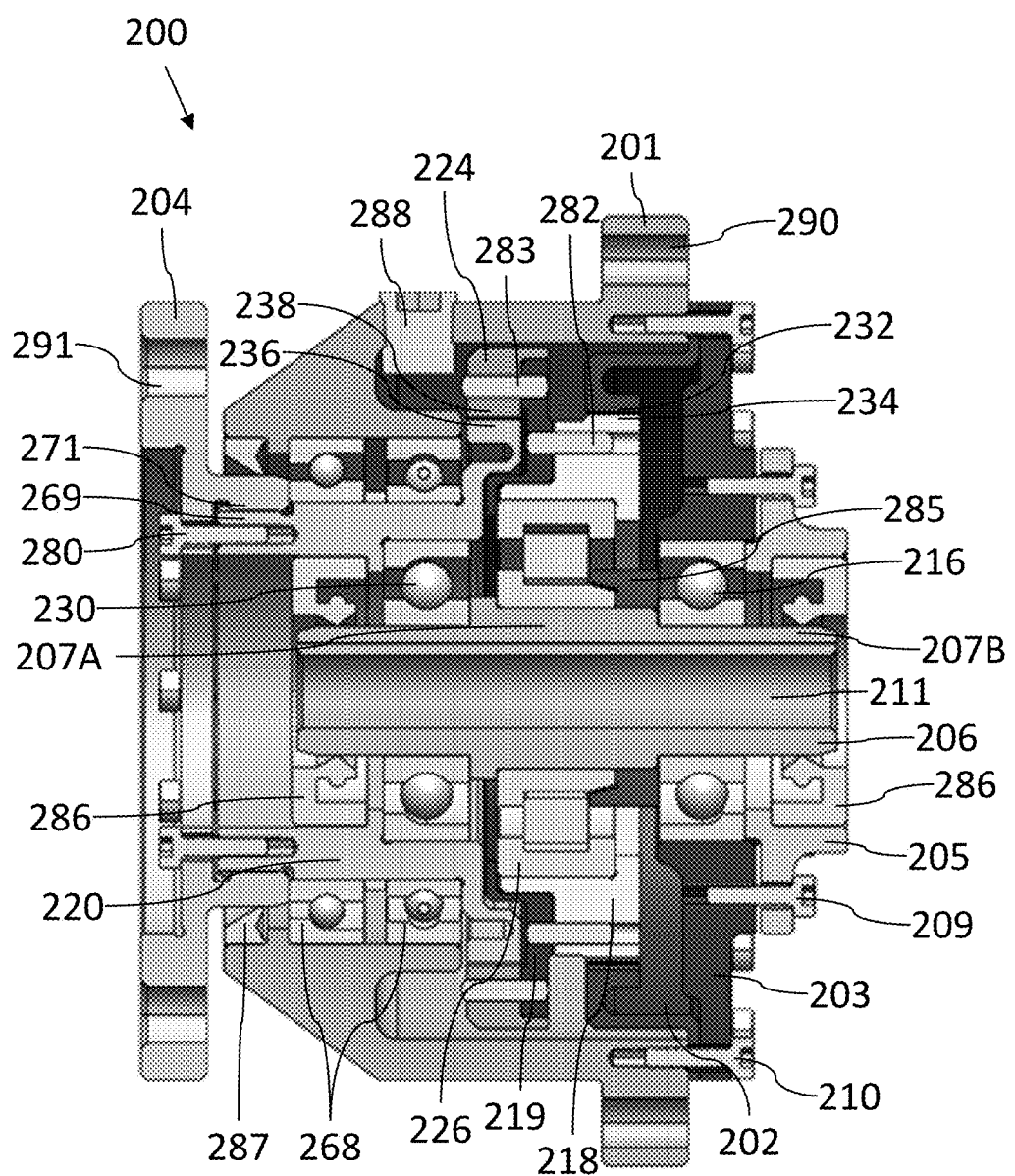
FIG. 2 is a sectional view of one example aspect of a circular wave drive 200.
Figure 3A:
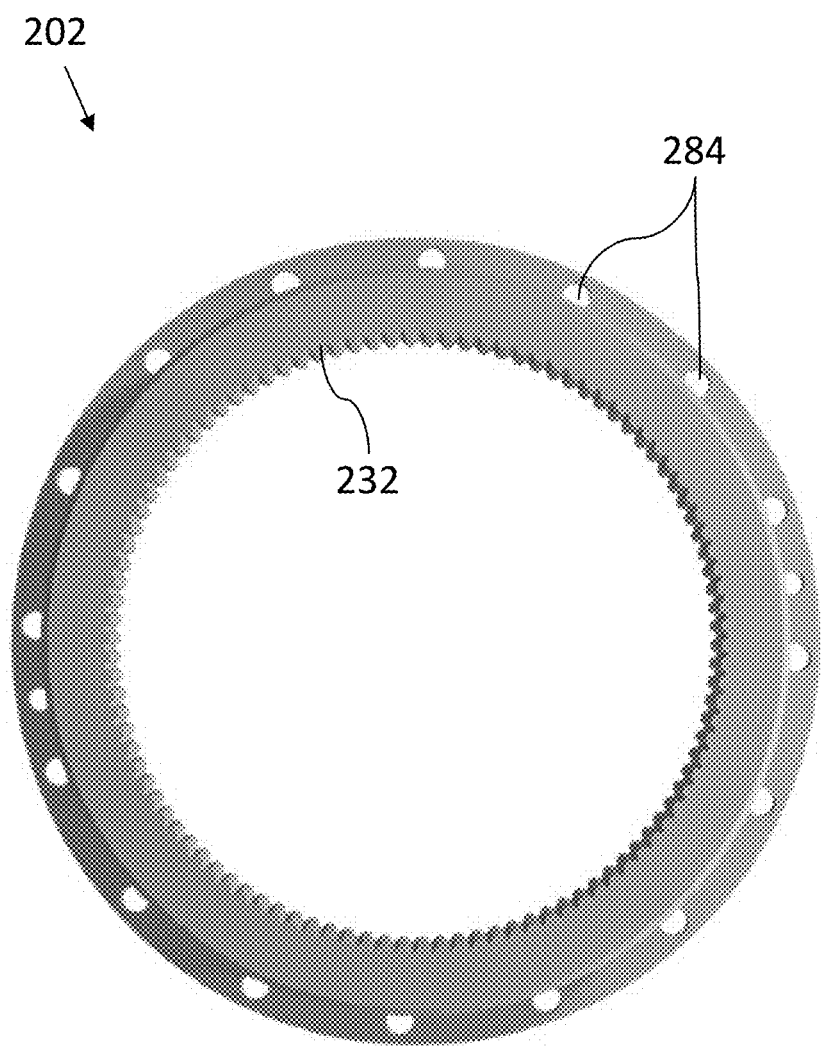
FIG. 3A is a front elevation view of one example aspect of an input ring gear 202.
Figures 3B, 3C:
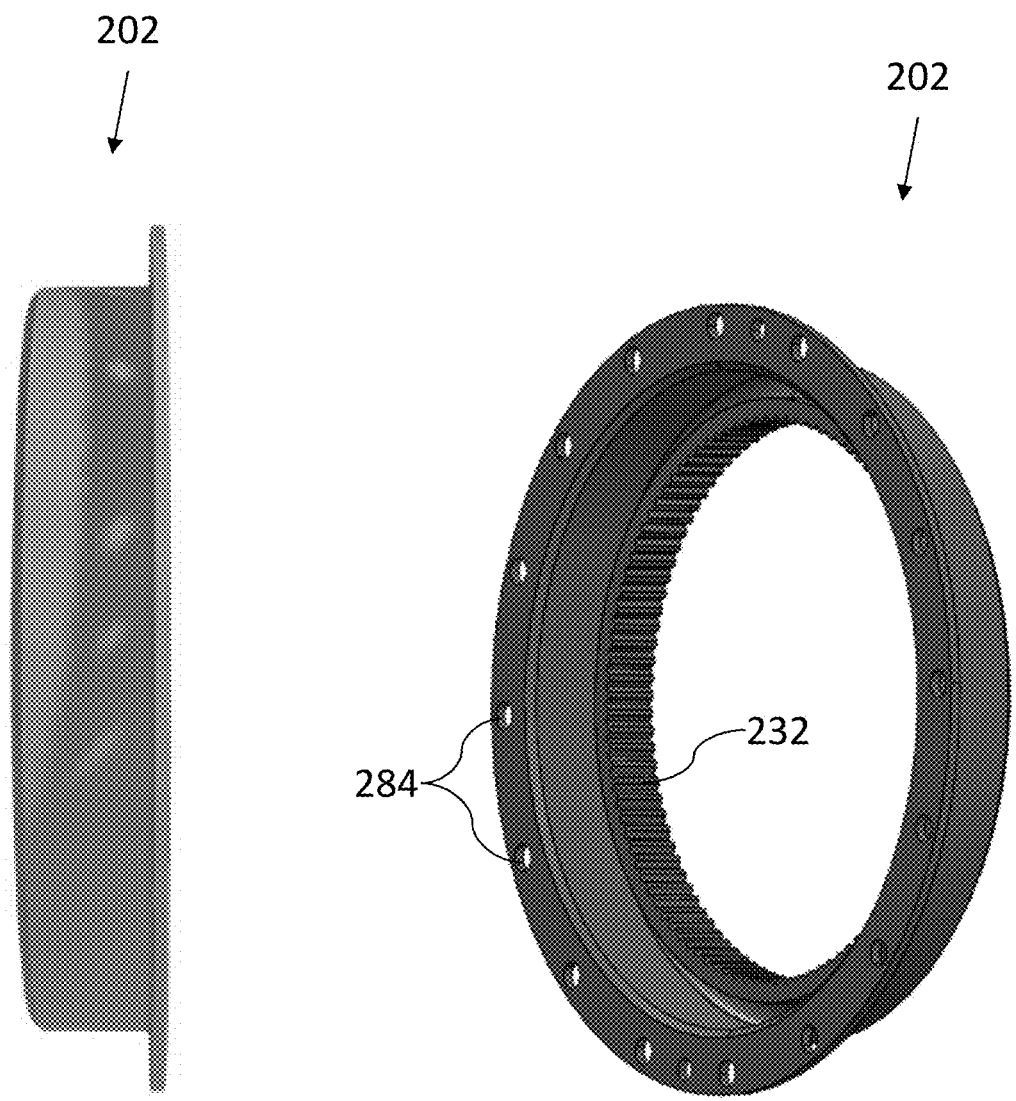
FIG. 3B is a side elevation view of one example aspect of input ring gear 202.
FIG. 3C is a side perspective view of one example aspect of input ring gear 202.
Figure 3D:
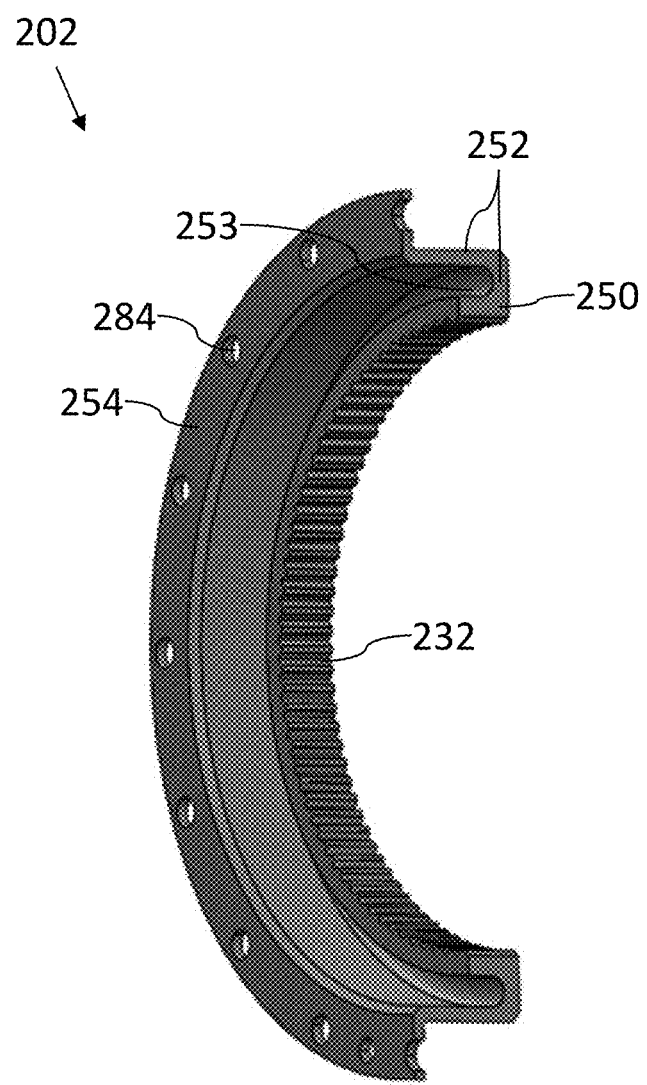
FIG. 3D is a side sectional view of one example aspect of input ring gear 202.
Figure 4A:
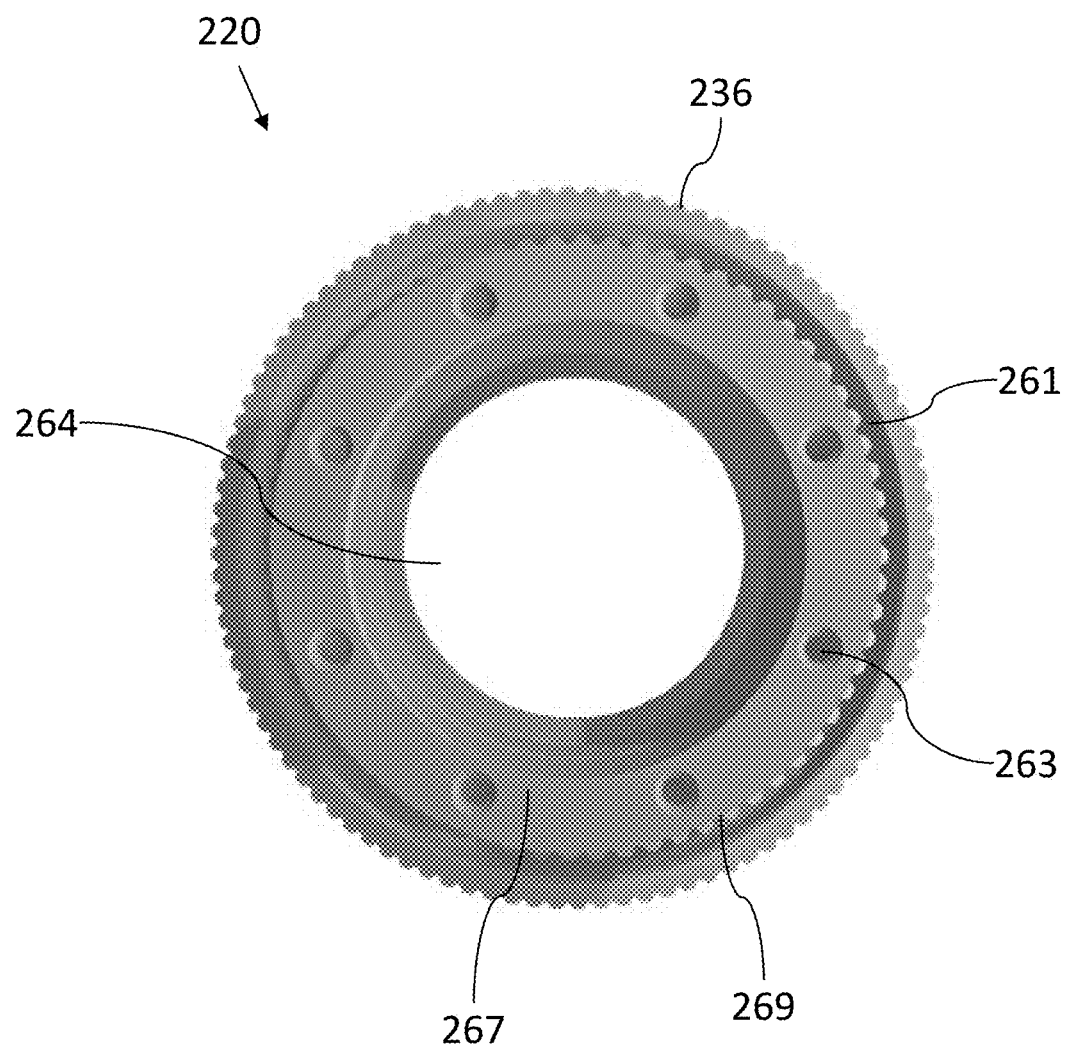
FIG. 4A is a first side elevation view of one example aspect of a primary drive gear 220.
Figure 4B:
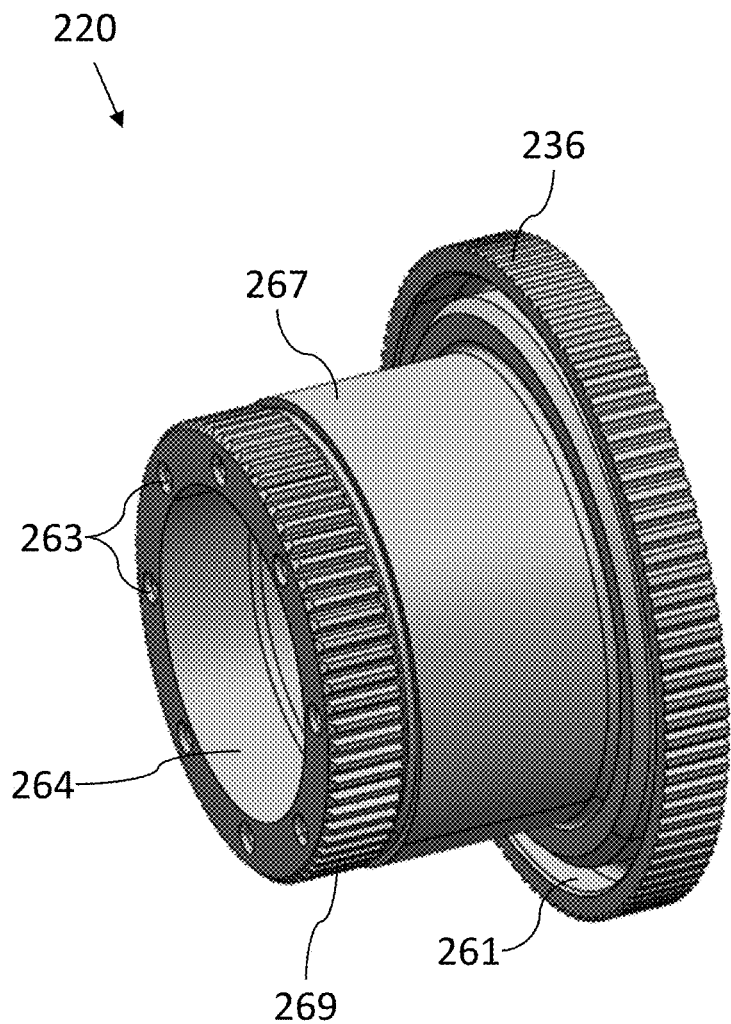
FIG. 4B is a first side perspective view of one example aspect of primary drive gear 220.
Figure 4C:
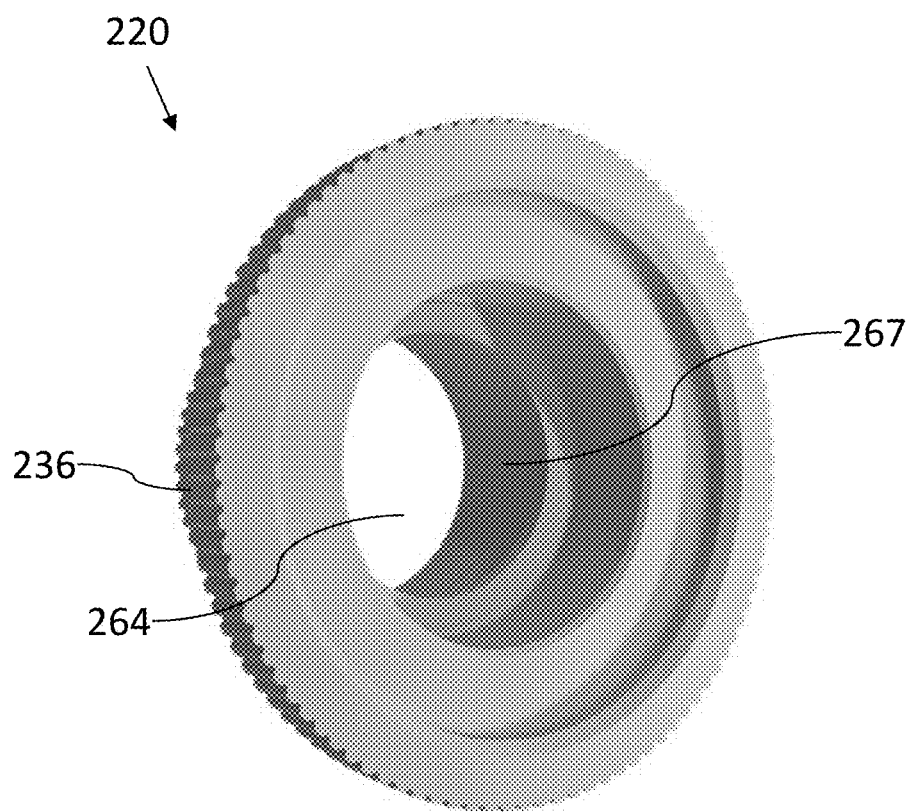
FIG. 4C is a second side perspective view of one example aspect of primary drive gear 220.
Figure 4D:
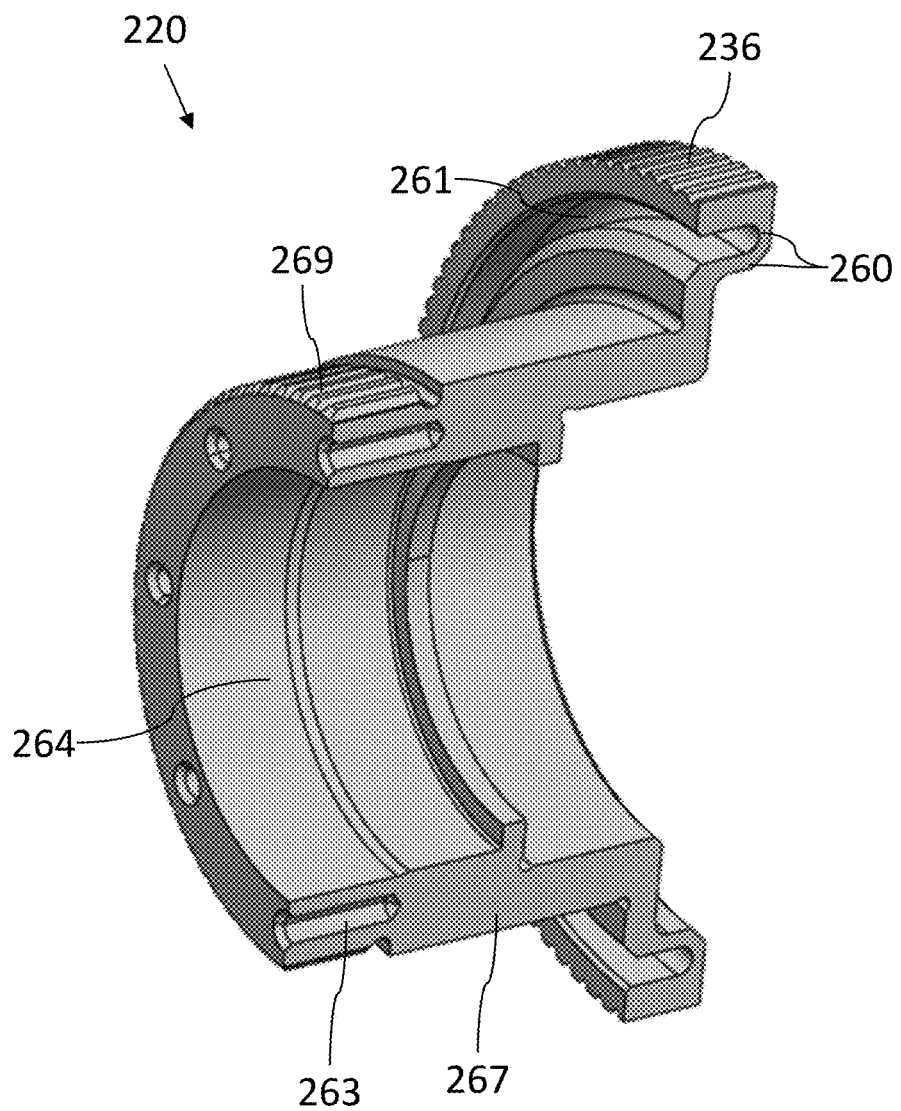
FIG. 4D is a sectional perspective view of one example aspect of primary drive gear 220.

FIG. 2 illustrates one example aspect of a circular wave drive 200. Circular wave drive 200 may include a housing 201, an eccentric motion generator 206 having an eccentric portion 207A and a non-eccentric portion 207B, an input cycloidal disc 218, a tie plate 219, a primary drive gear 220, an output cycloidal disc 224, an eccentric motion generator/input cycloidal disc bearing 226, and an eccentric motion generator/output drive element bearing 230. Circular wave drive 200 may include an input ring gear 202.

The assembled circular wave drive 200 may additionally include a flange plate 205 connected to end plate 203 via at least one fastener 209. End plate 203 may be connected to housing 201 via at least one fastener 210. At least one fastener 210 may be a threaded fastener.

Input ring gear 202 may be mounted to housing 201. End plate 203 may be mounted to input ring gear 202, sandwiching input ring gear 202 between end plate 203 and housing 201.

Circular wave drive 200 may include an output drive element 204, connected directly to primary drive gear 220 via at least one fastener 280. Output drive element 204 may include one or more mounting apertures 291. Apertures 291 may be used to fix output drive element 204 to another object. Apertures 291 may be configured to accept one or more fastener.

Housing 201 may include a substantially hollow interior configured to accept all of the aforementioned elements. Eccentric motion generator 206 may extend substantially through housing 201, and through each of the aforementioned elements.

Housing 201 may include one or more mounting apertures 290 oriented on a flange near the input end of circular wave drive 200. Apertures 290 may be used to fix housing 201 and circular wave drive 200 to a stationary object. Apertures 290 may be configured to accept one or more fastener.

Housing 201 may include at least one port 288. Port 288 may be an opening in housing 201 selectively sealed by a plug. Port 288 may be used to add a lubricant to the interior of housing 201 so as to lubricate at least some moving components of circular wave drive 200. Port 288 may be used for ventilation to allow release of a pressure from within housing 201.

Eccentric motion generator 206 may include an eccentric portion 207A extending radially outwardly from the non-eccentric portion 207B remainder of eccentric motion generator 206. Eccentric portion 207A may have a centerline that is offset from the centerline of the non-eccentric portion 207B of eccentric motion generator 206. That is, the centerline of eccentric portion 207A is parallel to, and offset from, the centerline of non-eccentric portion 207B of eccentric motion generator 206. The centerline of non-eccentric portion 207B of eccentric motion generator 206 is collinear with the axis of rotation of eccentric motion generator 206.

Eccentric motion generator 206 may include a hollow central bore 211. Central bore 211 may be a void extending part or all of the length of eccentric motion generator 206.

Input ring gear 202 may include input ring gear teeth 232. Input cycloidal disc 218 may include input cycloidal disc gear teeth 234. Output cycloidal disc 224 may include internal output cycloidal disc teeth 238. Primary drive gear 220 may include external primary drive gear teeth 236.

Input ring gear teeth 232, input cycloidal disc gear teeth 234, external primary drive gear teeth 236, and internal output cycloidal disc teeth 238 each have a tooth height.

Input cycloidal disc 218 may include a hollow center portion, such that disc 218 is in the shape of an annulus. Input cycloidal disc 218 may include a friction element, which may be exterior input cycloidal disc gear teeth 234, about its radially outer edge.

Output cycloidal disc 224 may include a hollow center portion, such that gear 224 is in the shape of an annulus. Output cycloidal disc 224 may include a friction element, which may be internal output cycloidal disc teeth 238, about its radially inner edge.

Input cycloidal disc 218 and output cycloidal disc 224 may be directly connected to one another in a concentric configuration, and thus rotate together in a 1:1 ratio. Input cycloidal disc 218 and output cycloidal disc 224 may be connected to one another via tie plate 219 in a concentric configuration, and thus rotate together in a 1:1 ratio. Fasteners 282 and 283, such as screws, bolts, pins, or rivets, may connect input cycloidal disc 218 to output cycloidal disc 224, either directly or through tie plate 219.

Circular wave drive 200 may include at least one primary drive gear/housing bearing 268. Circular wave drive 200 may include a plurality of primary drive gear/housing bearings 268, including for example, two. Primary drive gear/housing bearing 268 may be oriented between primary drive gear 220 and housing 201. One or more of eccentric motion generator bearing 216, eccentric motion generator/input cycloidal disc bearing 226, eccentric motion generator/output drive element bearing 230, and primary drive gear/housing bearing 268 may be rolling element bearings. The inner race of eccentric motion generator bearing 216 may connect directly to, and encircle, eccentric motion generator 206, while the outer race of eccentric motion generator bearing 216 may connect directly to, and be encircled by, end plate 203. The inner race of eccentric motion generator/input cycloidal disc bearing 226 may connect directly to, and encircle, eccentric portion 207A of eccentric motion generator 206, while the outer race of eccentric motion generator/input cycloidal disc bearing 226 may connect directly to, and be encircled by, input cycloidal disc 218. The inner race of eccentric motion generator/output drive element bearing 230 may connect directly to, and encircle, eccentric motion generator 206, while the outer race of eccentric motion generator/output drive element bearing 230 may connect directly to, and be encircled by, primary drive gear 220. The inner race of primary drive gear/housing bearing 268 may connect directly to, and encircle, primary drive gear 220, while the outer race of primary drive gear/housing bearing 268 may connect directly to, and be encircled by, housing 201.

Eccentric motion generator/input cycloidal disc bearing 226 may be engaged by an angle ring 285. Angle ring 285 may be utilized to maintain rollers inside of eccentric motion generator/input cycloidal disc bearing 226 with minimal axial disposition and minimum friction.

It is understood that each of the aforementioned bearings allow rotation of the element connected to the inner race of the bearing, and the element connected to the outer race of the bearing, relative to one another.

Primary drive gear 220 may include a hollow center portion, such that primary drive gear 220 is in the shape of an annulus. Primary drive gear 220 may include a friction element, which may be external primary drive gear teeth 236, about its radially outer edge. Primary drive gear 220 may include external splines 269 configured to mate with internal splines 271 of output drive element 204. Splines 269 and 271 may engage one another to prevent output drive element 204 from rotating relative to primary drive gear 220. Stated differently, output drive element 204 is directly connected to primary drive gear 220 such that the two rotate together with a 1:1 ratio.

When assembled in circular wave drive 200, input ring gear teeth 232 engage input cycloidal disc gear teeth 234, and via this tooth engagement and the eccentric motion of input cycloidal disc 218 (imparted via its engagement with eccentric portion 207A), input ring gear 202 and input cycloidal disc 218 rotate relative to one another about an axis parallel to the axis of rotation of eccentric motion generator 206.

When assembled in circular wave drive 200, external primary drive gear teeth 236 engage internal output cycloidal disc teeth 238, and via this tooth engagement and the eccentric motion of output cycloidal disc 224 (imparted via its engagement with eccentric portion 207A), output cycloidal drive 220 rotates relative to output cycloidal disc 224 about an axis parallel to the axis of rotation of eccentric motion generator 206.

Via the aforementioned tooth engagements, rotation of eccentric motion generator 206 causes rotation of eccentric portion 207A, which causes input cycloidal disc 218 and thus output cycloidal disc 224 (which are connected to one another) to rotate. The rotation of output cycloidal disc 224 causes primary drive gear 220 to rotate, and this rotation of primary drive gear 220 causes output drive element 204 to rotate as the two are connected directly to one another via at least one fastener 280.

Stated differently, in practice, a rotational force may be input to eccentric motion generator 206, which may cause rotation of eccentric motion generator 206 and eccentric portion 207A. Eccentric motion generator 206 may be permitted to rotate within end plate 203 via eccentric motion generator bearing 216. Eccentric portion 207A of eccentric motion generator 206 may engage input cycloidal disc 218 via eccentric motion generator/input cycloidal disc bearing 226, which eccentric rotation may cause input cycloidal disc 218 to engage and rotate along input ring gear teeth 232. Rotation of input cycloidal disc 218 may cause a like eccentric rotation of output cycloidal disc 224. Eccentric rotation of output cycloidal disc 224 may cause primary drive gear 220 to engage and rotate along output cycloidal disc 224. Rotation of primary drive gear 220 may cause rotation of output drive element 204, and the two may be configured to rotate relative to housing 201 via primary drive gear/housing bearing 268. The speed of rotation of output drive element 204 may be reduced relative to the speed of rotation of eccentric motion generator 206 pursuant to a reduction ratio.

Circular wave drive 200 may include various seals to allow a lubricant, such as oil, to be contained within its interior to aid in operation and reduction of wear. Circular wave drive 200 may include a shaft lip seal 286 at one or both of the input end and output end of eccentric motion generator 206. Circular wave drive 200 may include an output drive element/housing lip seal 287. Seals 286 and 287 are configured to allow the elements touching the inside and outside of the seal to rotate relative to one another, while maintaining a sealing closure between the aforementioned elements to retain lubrication within circular wave drive 200 and keep foreign items, dust, and debris out of circular wave drive 200.

Non-eccentric portion 207B of eccentric motion generator 206 may be concentric with input ring gear 202, primary drive gear 220, and output drive element 204. Eccentric portion 207A may be concentric with input cycloidal disc 218, output cycloidal disc 224, and tie plate 219.

It is contemplated that circular wave drives 100 and 200 may be used in any of a variety of actuation and/or gear reduction applications, including for example: robotic actuation, mechanical actuation, aerospace actuation, or vehicle transmissions.

The circular wave drives described herein, including for example, circular wave drives 100 and 200, may include two or more stages of cycloidal gears. In one aspect, a circular wave drive may include two stages of cycloidal gears. In another aspect, a circular wave drive may include three stages of cycloidal gears. In another aspect, a circular wave drive may include more than two stages of cycloidal gears. In one aspect, a circular wave drive may include two or more stages of cycloidal gears, wherein the two or more stages of cycloidal gears are subtractive. The circular wave drive may include two stages of cycloidal gears, and the two stages may be subtractive. In one aspect, the inclusion of multiple stages of cycloidal gears may permit a circular wave drive to have high reduction ratios. In one aspect, the inclusion of multiple stages of cycloidal gears, wherein the stages are subtractive, may permit a circular wave drive to have high reduction ratios.

The reduction ratio of eccentric motion generator 206 rotational velocity to output drive element 204 rotational velocity may be calculated through the formula described above.

Accordingly, where one desires a specific reduction ratio, one may design circular wave drive 200 such that the number of gear teeth of each of input ring gear 202, input cycloidal disc 218, output cycloidal disc 224, and primary drive gear 220 effect the desired reduction ratio.

Any of the aforementioned teeth may have any of a variety of gear tooth profiles, including for example, a sinusoidal tooth profile.

In one aspect, circular wave drive 200 is not reverse-drivable, and as such can only be operated in one rotational direction. In another aspect, circular wave drive 200 is reverse-drivable, and as such can be operated in more than one rotational direction.

Eccentric motion generator 206 and output drive element 204 may be oriented on opposite sides of circular wave drive 200. Alternatively, eccentric motion generator 206 and output drive element 204 may be oriented on the same side of circular wave drive 200.

FIGS. 3A-3D illustrate one example aspect of an input ring gear 202. Input ring gear may include input ring gear teeth 232 contained upon a non-compliant portion 250, a compliant wall 252, and an input ring gear mounting flange 254 including at least one mounting aperture 284.

Compliant wall 252 extends between, and connects, non-compliant portion 250 and input ring gear mounting flange 254. Between compliant wall 252 and non-compliant portion 250 may be oriented a relief groove 253. Relief groove 253 may permit elastic body deformation between compliant wall 252 and non-compliant portion 250.

Due to the difficulty in obtaining and maintaining the necessary tolerances in the production of the circular wave drives disclosed herein, including for example within ring gear 202 and input cycloidal disc 218, obtaining and maintaining the proper backlash between the input ring gear teeth 232 and input cycloidal disc gear teeth 234 can be very difficult. To alleviate this difficulty, input ring gear 202 may be designed as a compliant element.

A compliant element, as the term is used herein, refers to flexible mechanisms that transfer an input force and displacement at one point to an output force and displacement at another point through elastic body deformation.

Thus, compliant wall 252 and relief groove 253 permit the elastic deformation of input ring gear 202, so as to permit non-compliant portion 250 and input ring gear teeth 232, as a unit, to be displaced and achieve the desired backlash when engaging input cycloidal disc gear teeth 234. In one aspect, compliant wall 252 biases input ring gear teeth 232 into a desired relative engagement with input cycloidal disc gear teeth 234.

Non-compliant portion 250 contains input ring gear teeth 232 and has a stiffness necessary to maintain the structural integrity of input ring gear teeth 232. That is, non-compliant portion 250 and input ring gear teeth 232 are not intended to be flexible, or elastically deform, in the sense that compliant wall 252 is intended to be flexible and elastically deform.

The compliance of input ring gear 202, and elastic body deformation of compliant wall 252 may be achieved in a number of manners, including for example, varying material strengths, geometries, thicknesses, as well as the orientation and size of relief groove 253.

That is, compliant wall 252 could be a separate material from one or both of non-compliant portion 250 or mounting flange 254, wherein the material of compliant wall 252 has increased flexibility when compared to the material of non-compliant portion 250 or mounting flange 254.

Alternatively, compliant wall 252 may be designed with specific dimensions to achieve the desired elastic deformation. The dimensions of compliant wall 252 and relief groove 253 may permit a bending moment in compliant wall 252 that results in the translation/deflection of input ring gear teeth 232.

It is understood that these relative dimensions may differ between input ring gears 202 having different materials and thus different material properties.

FIGS. 4A-4D illustrate example aspects of a primary drive gear 220. Primary drive gear 220 may include external primary drive gear teeth 236, a compliant wall 260, a relief groove 261, at least one mounting aperture 263, a central bore 264, and a hub 267. Hub 267 may include external splines 269.

As illustrated in assembled circular wave drive 200 of FIG. 2, hub 267 may be encircled by primary drive gear/housing bearing 268. Hub 267 may include at least one mounting aperture 263 configured to receive at least one fastener 280 to connect primary drive gear 220 to output drive element 204. Eccentric motion generator 206 may extend through central bore 264 in the assembled circular wave drive 200. External splines 269 may mate with internal splines 271 of output drive element 204, to further connect primary drive gear 220 to output drive element 204.

Compliant wall 260 may extend axially and radially outwardly from hub 267. Additionally, external primary drive gear teeth 236 may be at least somewhat cantilevered relative to compliant wall 260 (that is, offset axially), and may be connected to compliant wall 260 with relieve groove 261 causing the cantilevered orientation.

Due to the difficulty in obtaining and maintaining the necessary tolerances in the production of the circular wave drives disclosed herein, including for example within primary drive gear 220 and output cycloidal disc 224, obtaining and maintaining the proper backlash between the external primary drive gear teeth 236 and internal output cycloidal disc teeth 238 can be very difficult. To alleviate this difficulty, primary drive gear 220 may be designed as a compliant element.

Compliant wall 260 may permit elastic deformation of external primary drive gear teeth 236 via compliant wall 260's material property, material thickness, and geometry, as well as the size and orientation of relief groove 261. In one aspect, compliant wall 260 causes external primary drive gear teeth 236 to be biased into a desired relative engagement with output cycloidal disc teeth 238.

Compliant wall 260 may have a reduced thickness (in the axial direction) to allow for a bending moment in compliant wall 260, which allows for translation/deflection of external primary drive gear teeth 236.

It is understood that reduced material thickness as described above results in reduced strength within the reduced thickness areas.

Figure 5A:
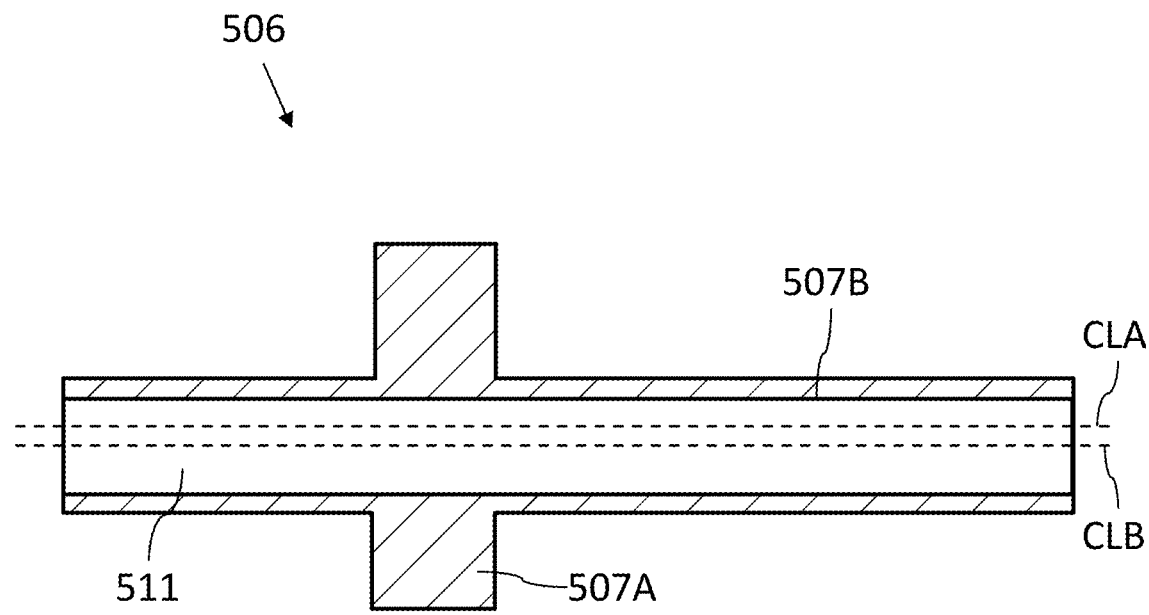
FIG. 5A is a side sectional view of one example aspect of an eccentric motion generator 506.
Figure 5B:
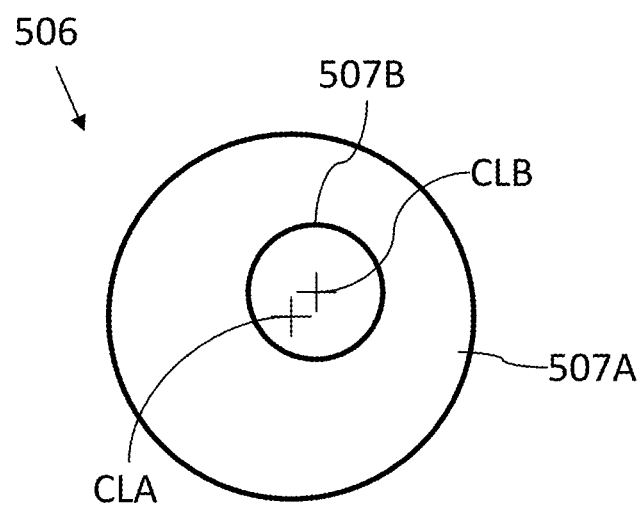
FIG. 5B is a front view of one example aspect of eccentric motion generator 506.

FIGS. 5A and 5B illustrate one example aspect of an eccentric motion generator 506. Eccentric motion generator 506 may have a hollow central bore 511. Eccentric motion generator 506 includes an eccentric portion 507A and a non-eccentric portion 507B. Eccentric portion 507A has a centerline CLA, while non-eccentric portion 507B has a centerline CLB. Centerline CLA and centerline CLB may be parallel to, and offset from, one another.

In one aspect, eccentric motion generator 506 may be constrained such that it is able to rotate about centerline CLB of non-eccentric portion 507B. In this aspect, eccentric portion 507A rotates with non-eccentric portion 507B, but the rotation of eccentric portion 507A is eccentric. In this manner, eccentric motion generator 506 may convert a rotational input into an eccentric motion.

FIG. 6 is a flowchart illustrating an example method 600 for determining a reduction radio of a circular wave drive. Method 600 includes selecting a desired reduction ratio for the circular wave drive (step 610). Method 600 further includes providing a circular wave drive including: an input ring gear having internal gear teeth (a); an input cycloidal disc having external gear teeth (b), the input cycloidal disc gear teeth at least partially engaging the input ring gear teeth; a primary drive gear having external gear teeth (d), the primary drive gear fixed to the input cycloidal disc; an output cycloidal disc having internal gear teeth (c), and the output cycloidal disc teeth at least partially engaging the primary drive gear teeth (step 620). Method 600 further includes calculating a reduction ratio using the equation: Reduction Ratio=

$$\left[\frac{a}{b}\left(\frac{c-d}{c}\right) - \frac{a-b}{a}\right]^{-1} :1$$

where a=the number of gear teeth of input ring gear 102; 202;
where b=the number of gear teeth of input cycloidal disc 118; 218;
where c=the number of gear teeth of output cycloidal disc 124; 224; and
where d=the number of gear teeth of primary drive gear 120; 220 (step 530).

Figure 7A:
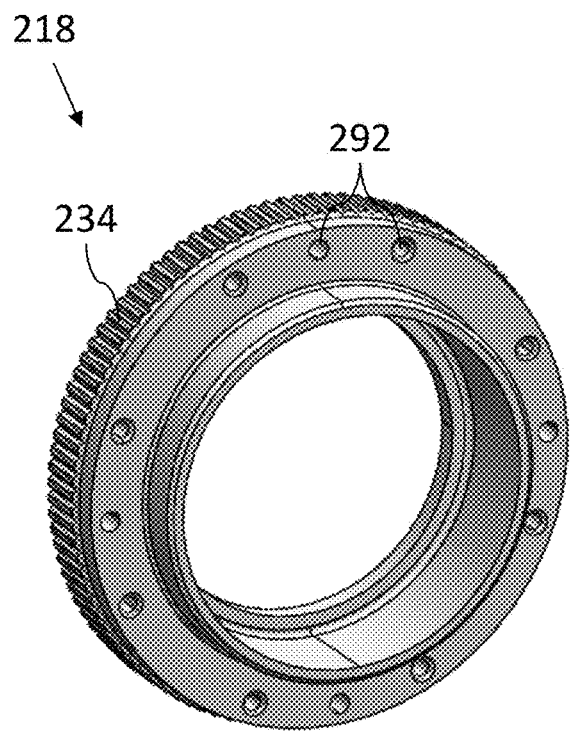
FIG. 7A is a front perspective view of one example aspect of an input cycloidal disc 218.
Figure 7B:
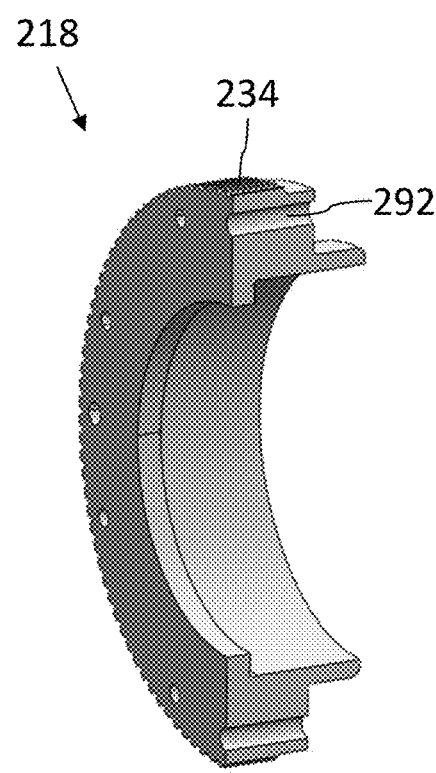
FIG. 7B is a sectional perspective view of one example aspect of input cycloidal disc 218.

FIGS. 7A and 7B illustrate one example aspect of input cycloidal disc 218. Input cycloidal disc 218 may include external input cycloidal disc gear teeth 234 and at least one mounting aperture 292.

Figure 8A:
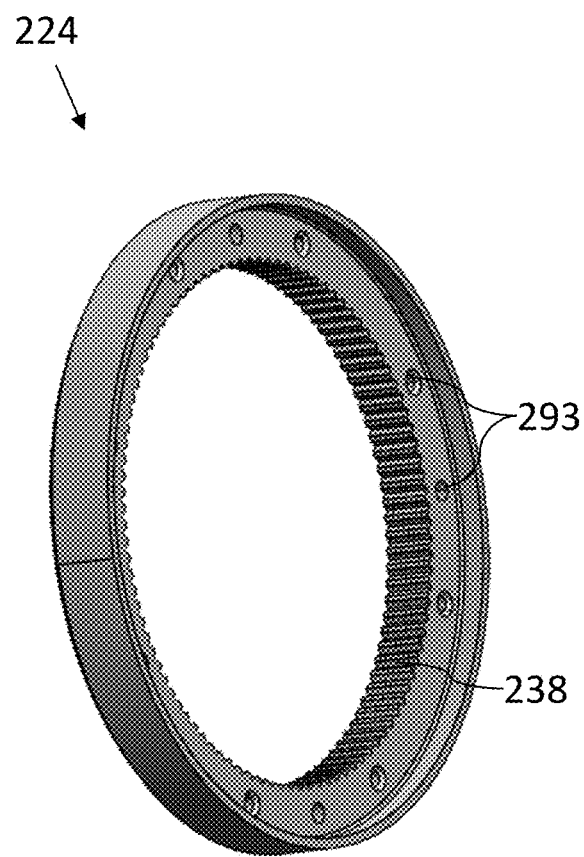
FIG. 8A is a front perspective view of one example aspect of an output cycloidal disc 224.
Figure 8B:
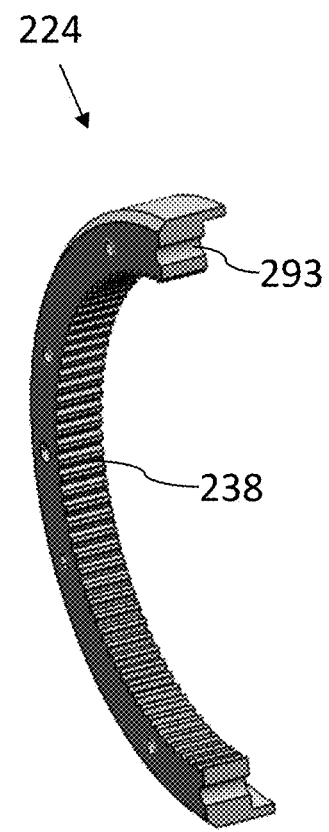
FIG. 8B is a sectional perspective view of one example aspect of output cycloidal disc 224.

FIGS. 8A and 8B illustrate one example aspect of output cycloidal disc 224. Output cycloidal disc 224 may include internal output cycloidal disc teeth 238 and at least one mounting aperture 293.

Figure 9A:
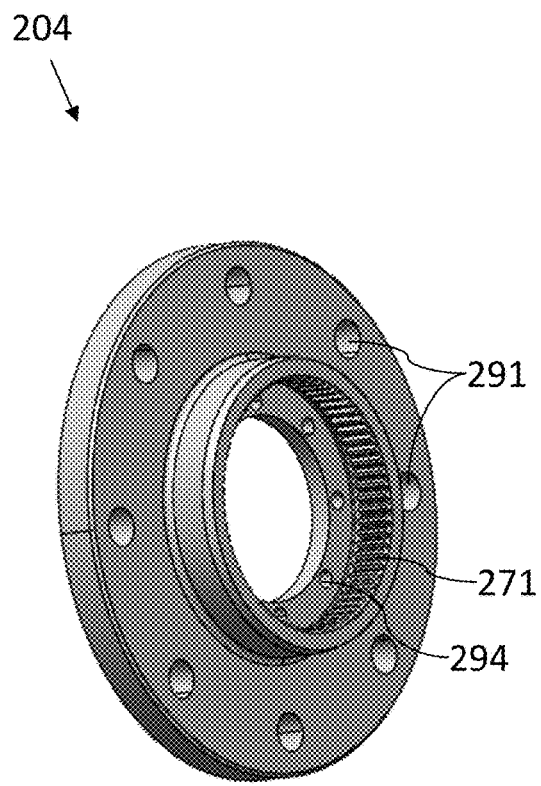
FIG. 9A is a front perspective view of one example aspect of an output drive element 204.
Figure 9B:
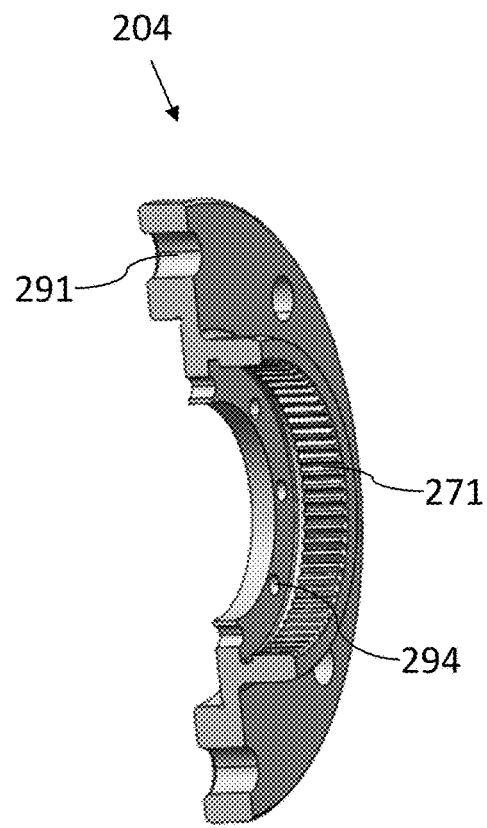
FIG. 9B is a sectional perspective view of one example aspect of output drive element 204.

FIGS. 9A and 9B illustrate one example aspect of output drive element 204. Output drive element 204 may include internal splines 271, at least one mounting aperture 291, and at least one mounting aperture 294. Mounting aperture 294 may be configured to accept fastener 280, which in addition to splines 269 and 271, connect output drive element 204 to primary drive gear 220.

FIGS. 10A and 10B illustrate one example aspect of an angle ring 285. As illustrated in FIG. 15B, angle ring 285 may engage eccentric motion generator/input cycloidal disc bearing 226 in place on eccentric portion 207A of eccentric motion generator 206. Eccentric motion generator 206 may include a non-eccentric portion 207B and a hollow central bore 211.

Figure 11:
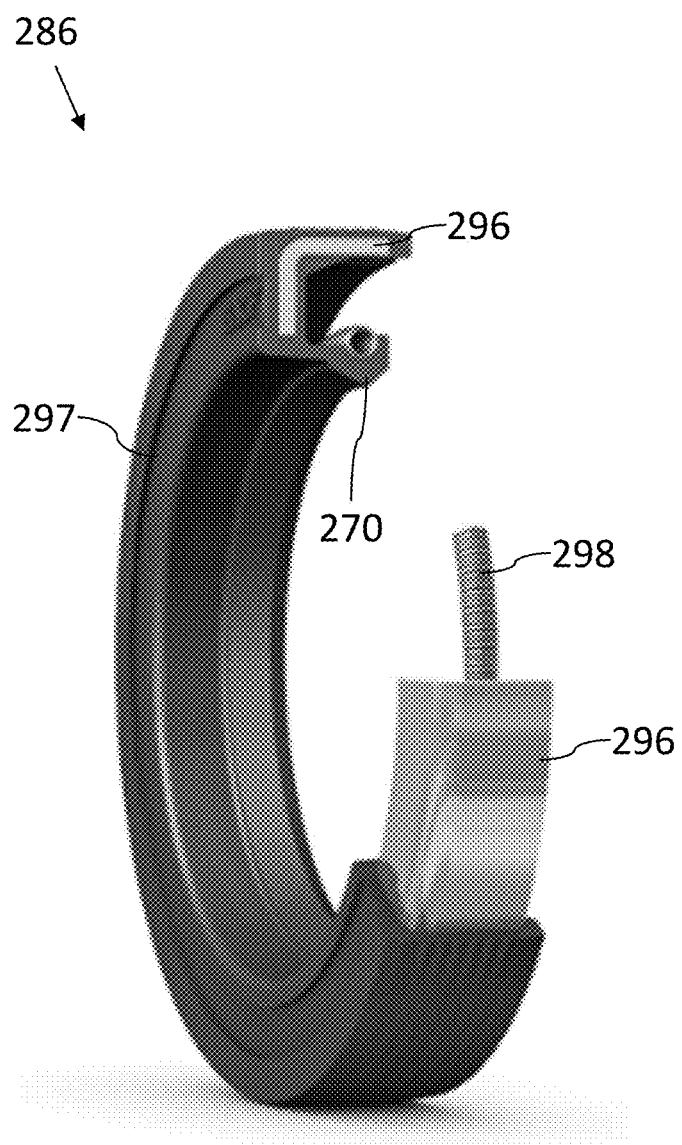
FIG. 11 is a sectional perspective view of one example aspect of a shaft lip seal 286.

FIG. 11 illustrates one example aspect of a shaft lip seal 286. Seal 286 may include an internal frame member 296 acting to strengthen and stiffen seal 286. Frame member 296 may be over-molded in a polymeric coating 297, including for example, a rubber material.

Seal 286 may include a biasing element 298 oriented radially outwardly of a sealing lip 270. Biasing element 298 may be configured to bias sealing lip 270 radially inwardly into contact with eccentric motion generator 206. Sealing lip 270's engagement with a radially outer aspect of eccentric motion generator 206 (including for example, non-eccentric portion 207B) acts to seal in lubricant and seal out debris or foreign matter that would be detrimental to the operation of circular wave drive 200.

Figure 12A:
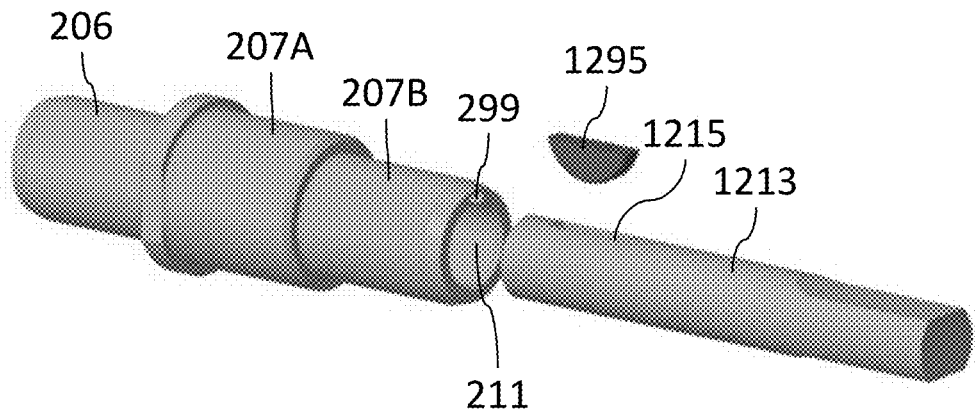
FIG. 12A is a front perspective view of one example aspect of an eccentric motion generator 206.
Figure 12B:
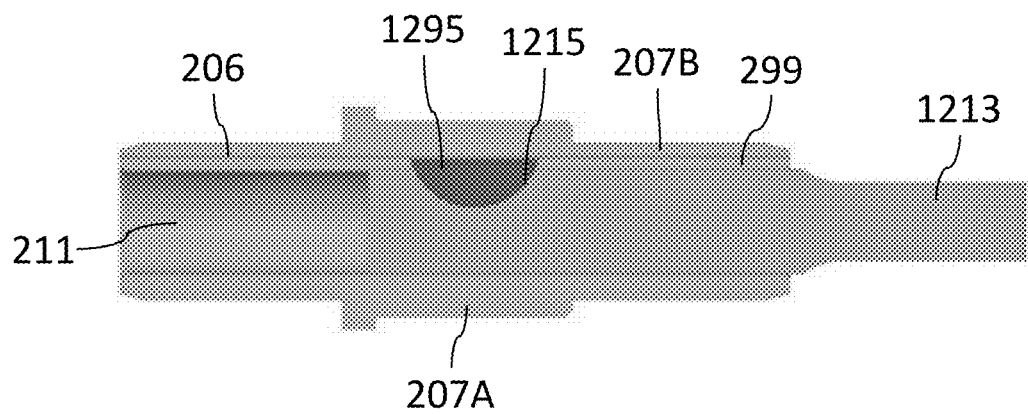
FIG. 12B is a sectional perspective view of one example aspect of eccentric motion generator 206.

FIGS. 12A and 12B illustrate one example aspect of eccentric motion generator 206. Eccentric motion generator 206 may include a hollow central bore 211, an eccentric portion 207A, and a non-eccentric portion 207B. Eccentric motion generator 206 may include a keyway 299 extending from hollow central bore 211, configured to accept and engage a key 1295 (such as a Woodruff key).

An input rotational actuator shaft 1213 may be sized and shaped to fit within central bore 211. Shaft 1213 may include a slot 1215 for accepting key 1295 within keyway 299. In this manner, shaft 1213 may be connected to eccentric motion generator 206 and mated so that rotation of shaft 1213 causes rotation of eccentric motion generator 206.

Figure 13A:
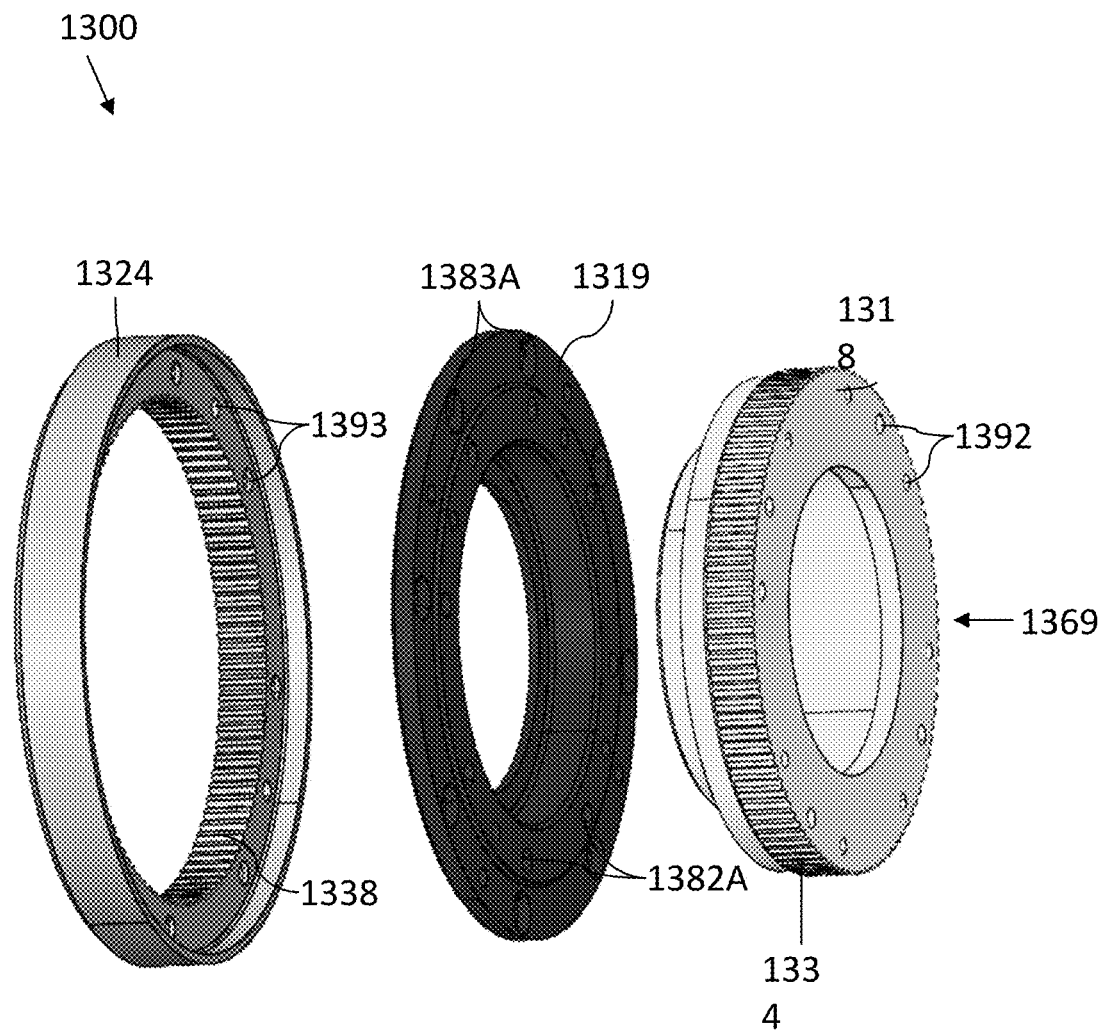
FIG. 13A is an exploded view of an input cycloidal disc 1318 and output cycloidal disc 1324 assembly 1300.
Figure 13B:
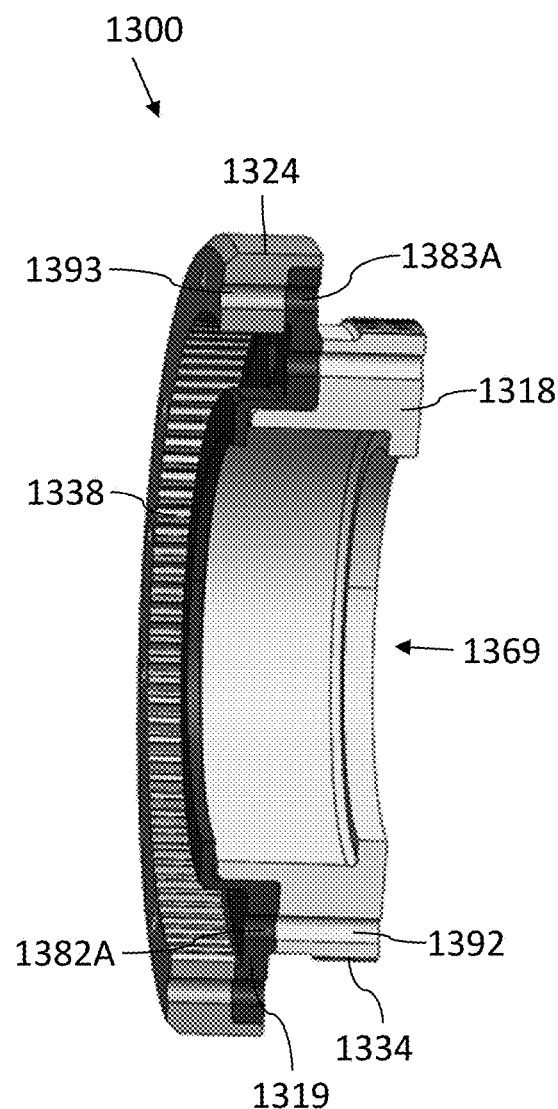
FIG. 13B is a sectional perspective view of input cycloidal disc 1318 and output cycloidal disc 1324 assembly 1300.
Figure 13C:
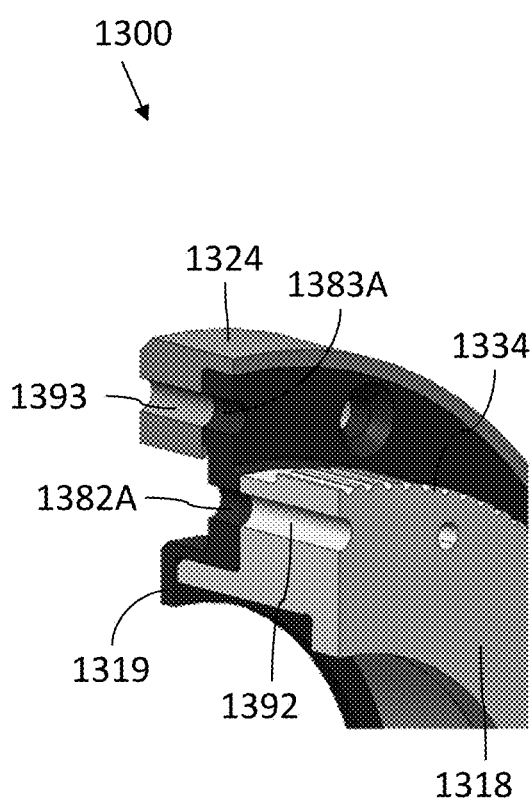
FIG. 13C is a partial sectional perspective view of input cycloidal disc 1318 and output cycloidal disc 1324 assembly 1300.
Figure 14A:
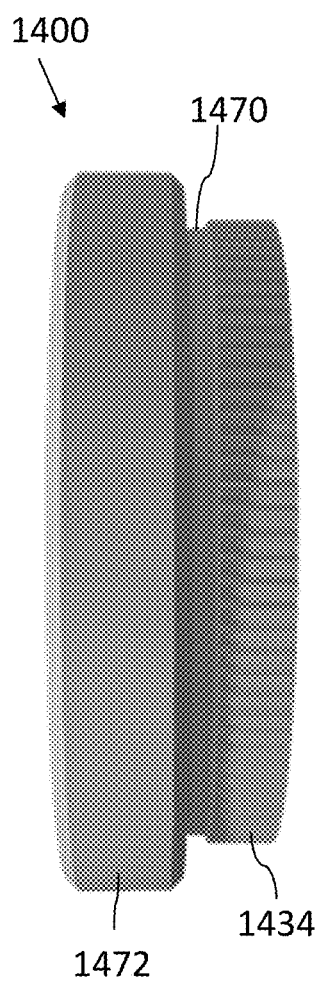
FIG. 14A is a side elevation view of a combined input and output cycloidal disc 1400.
Figure 14B:
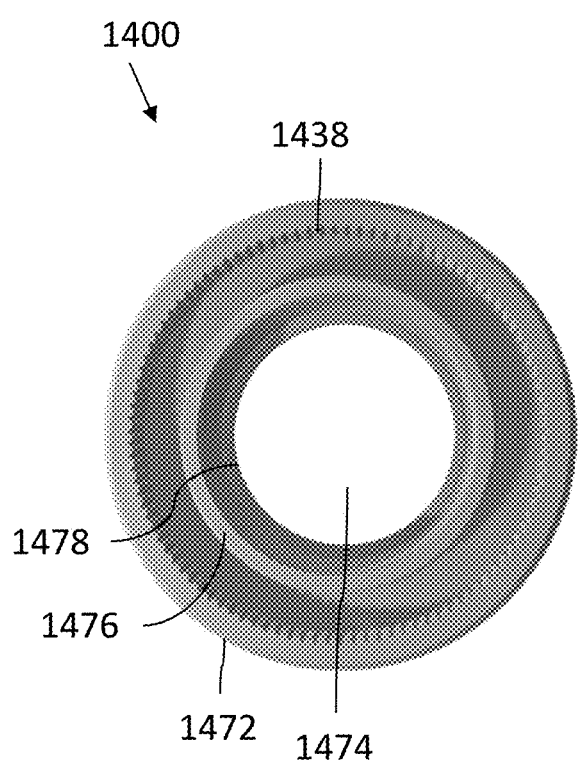
FIG. 14B is an output side elevation view of combined input and output cycloidal disc 1400.
Figure 14C:
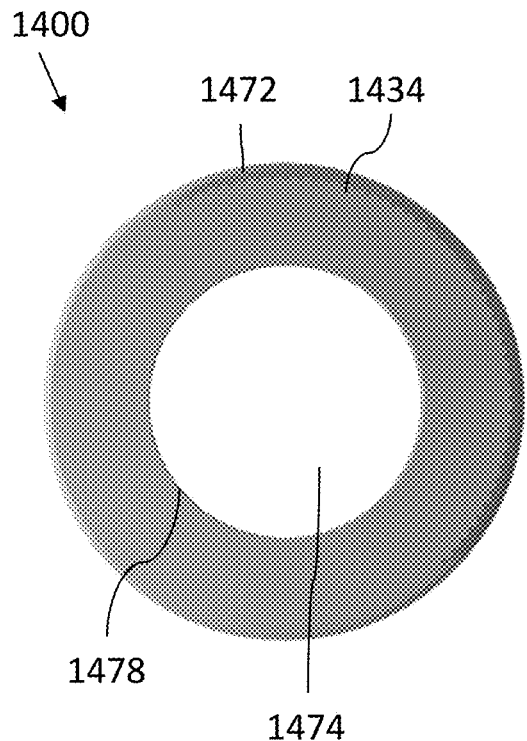
FIG. 14C is an input side elevation view of combined input and output cycloidal disc 1400.
Figure 14D:
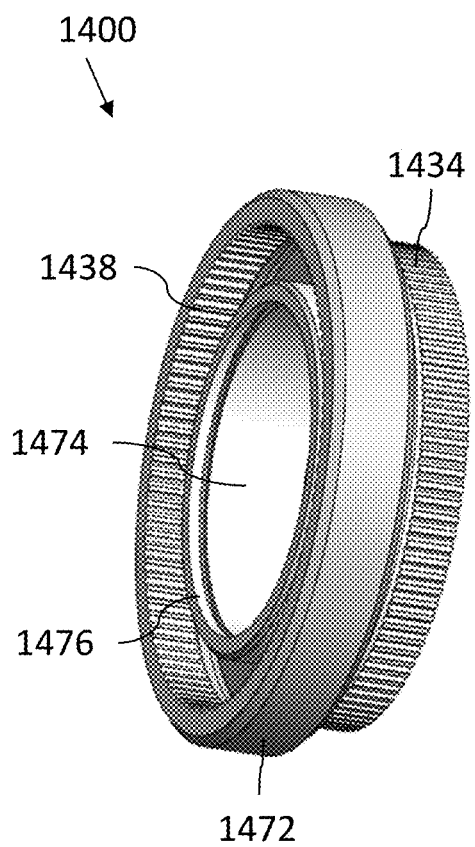
FIG. 14D is a side perspective view of combined input and output cycloidal disc 1400.

FIGS. 13A-13C illustrate one example aspect of an input cycloidal disc 1318 and output cycloidal disc 1324 assembly 1300.

Assembly 1300 may include an input cycloidal disc 1318. Input cycloidal disc 1318 may include a friction element, which may be exterior input cycloidal disc gear teeth 1334, about its radially outer edge. Input cycloidal disc 1318 may include at least one mounting aperture 1392. Input cycloidal disc 1318 may include a hollow center portion, such that disc 1318 is in the shape of an annulus.

Assembly 1300 may include an output cycloidal disc 1324. Output cycloidal disc 1324 may include a friction element, which may be internal output cycloidal disc teeth 1338, about its radially inner edge. Output cycloidal disc 1324 may include at least one mounting aperture 1393. Output cycloidal disc 1324 may include a hollow center portion, such that gear 1324 is in the shape of an annulus.

Assembly 1300 may include a tie plate 1319. Input cycloidal disc 1318 and output cycloidal disc 1324 may be connected to one another via tie plate 1319 in a concentric configuration, and thus rotate together in a 1:1 ratio. Tie plate 1319 may include at least one fastener aperture 1383A configured to receive a fastener extending into at least one mounting aperture 1393, connecting tie plate 1319 to output cycloidal disc 1324. Tie plate 1319 may include at least one fastener aperture 1382A configured to receive a fastener extending into at least one mounting aperture 1392, connecting tie plate 1319 to input cycloidal disc 1318. Fasteners may include, for example, screws, bolts, pins, or rivets, configured to connect input cycloidal disc 1318 to output cycloidal disc 1324, through tie plate 1319.

The hollow center portions of input cycloidal disc 1318, output cycloidal disc 1324, and tie plate 1319 form a hollow central bore 1369. Central bore 1369 may permit other elements of a circular wave drive (not shown) to pass therethrough or be oriented therein. For example, central bore 1369 may contain an eccentric motion generator and/or an eccentric motion generator/input cycloidal disc bearing.

When assembled in circular wave drive (not shown), an input ring gear's teeth engage input cycloidal disc gear teeth 1334, and via this tooth engagement and the eccentric motion of input cycloidal disc 1318 (imparted via its engagement with an eccentric motion generator), an input ring gear and input cycloidal disc 1318 rotate relative to one another about an axis parallel to the axis of rotation of the eccentric motion generator.

When assembled in circular wave drive (not shown), a primary drive gear's external primary drive gear teeth engage internal output cycloidal disc teeth 1338, and via this tooth engagement and the eccentric motion of output cycloidal disc 1324 (imparted via its engagement with an eccentric motion generator), an output cycloidal drive rotates relative to output cycloidal disc 1324 about an axis parallel to the axis of rotation of the eccentric motion generator.

Via the aforementioned tooth engagements, rotation of the eccentric motion generator causes input cycloidal disc 1318 and thus output cycloidal disc 1324 (which are connected to one another) to rotate. The rotation of output cycloidal disc 1324 causes a primary drive gear to rotate, and this rotation of the primary drive gear causes an output drive element to rotate as the two are connected directly to one another via at least one fastener.

FIGS. 14A-14F illustrate a combined input cycloidal disc and output cycloidal disc 1400. Disc 1400 may be an integral combination of input cycloidal disc 1318 and output cycloidal disc 1324. That is, in lieu of independent and separate input cycloidal disc 1318 and output cycloidal disc 1324 connected via a tie plate 1319, disc 1400 may be a singular, monolithic, unit formed from a single piece of material. Disc 1400 may be made of any of a variety of materials, including for example: metals such as steel or alloys; polymers; or organic materials. Disc 1400 may be made of any material having sufficient strength, hardness, or durability to perform a rotational reduction for a desired duration of intended use. Any of the various elements of disc 1400 may be formed through any of a variety of methods, including for example: machining, 3D printing/additive manufacturing, or forging.

Disc 1400 may include external input cycloidal gear teeth 1434 and internal output cycloidal teeth 1438. Input cycloidal gear teeth 1434 may be substantially similar to input cycloidal disc gear teeth 1334 described above. Output cycloidal disc teeth 1438 may be substantially similar to output cycloidal disc gear teeth 1338 described above.

Disc 1400 may include a hollow center portion 1474, such that disc 1400 is in the shape of an annulus. Disc 1400 may include a radially outer surface 1472 forming an outer diameter OD1, a radially inner wall 1478 forming an inner diameter, and an inner flange 1476.

Flange 1476 may overlap, axially, with output cycloidal teeth 1438. Flange 1476 may provide a larger (e.g., greater in axial length) internal surface of disc 1400 for engagement with elements oriented within center portion 1474 when disc 1400 is assembled in a circular wave drive (not shown). For example, an eccentric motion generator and/or an eccentric motion generator/input cycloidal disc bearing may be oriented within center portion 1474, and the axially longer internal surface of disc 1400 may permit a more stable, balanced, and/or reduced pressure engagement between disc 1400 and the aforementioned elements within center portion 1474. A radially inner surface (internal surface) of flange 1476 may include a groove 1482.

Groove 1482 may be used to engage a retention device for retaining an element (such as an eccentric motion generator/input cycloidal disc bearing (not shown)) within center portion 1474. For example, groove 1482 may receive and engage a retaining ring. The internal surface of disc 1400 may additionally include radially inner wall 1478 extending radially inwardly therefrom. Radially inner wall 1478 may likewise be used to retain an element (such as an eccentric motion generator/input cycloidal disc bearing (not shown)) within center portion 1474.

Disc 1400 may include a clearance gap 1470 axially inwardly of external input cycloidal gear teeth 1434. Clearance gap 1470 may extend radially inwardly into disc 1400 from the radially outward height of input cycloidal gear teeth 1434 and may extend axially inwardly from the axially inward-most portion of input cycloidal gear teeth 1434. Clearance gap 1470 may be used to permit cutting of input cycloidal gear teeth 1434 during the machining of disc 1400. Clearance gap 1470 may include radiused corners to reduce stress in the area of clearance gap 1470.

Disc 1400 may include a clearance gap 1480 axially inwardly of internal output cycloidal teeth 1438. Clearance gap 1480 may extend radially outwardly into disc 1400 from the radially inward height of output cycloidal teeth 1438 and may extend axially inwardly from the axially inward-most portion of output cycloidal teeth 1438. Clearance gap 1480 may be used to permit cutting of output cycloidal teeth 1438 during the machining of disc 1400. Clearance gap 1480 may include radiused corners to reduce stress in the area of clearance gap 1480.

When assembled in circular wave drive (not shown), an input ring gear's teeth engage input cycloidal gear teeth 1434, and via this tooth engagement and the eccentric motion of disc 1400 (imparted via its engagement with an eccentric motion generator), an input ring gear and disc 1400 rotate relative to one another about an axis parallel to the axis of rotation of the eccentric motion generator.

When assembled in circular wave drive (not shown), a primary drive gear's external primary drive gear teeth engage internal output cycloidal teeth 1438, and via this tooth engagement and the eccentric motion of disc 1400 (imparted via its engagement with an eccentric motion generator), a primary drive gear rotates relative to disc 1400 about an axis parallel to the axis of rotation of the eccentric motion generator.

Via the aforementioned tooth engagements, rotation of the eccentric motion generator causes disc 1400 to rotate. The rotation of disc 1400 causes a primary drive gear to rotate, and this rotation of the primary drive gear causes an output drive element to rotate as the two are connected directly to one another via at least one fastener.

Figure 15:
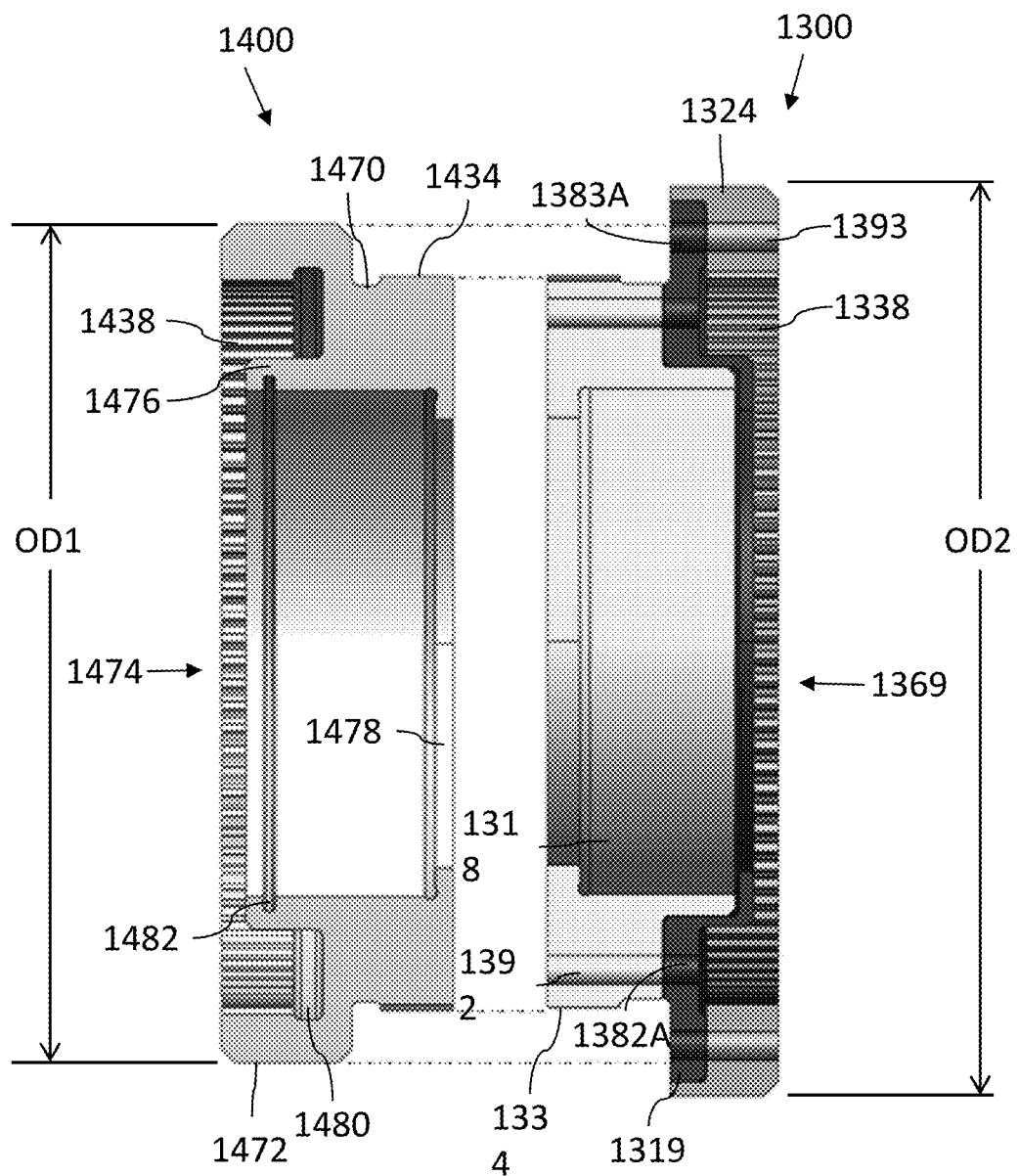
FIG. 15 is a sectional view comparison of assembly 1300 and combined input and output cycloidal disc 1400.

FIG. 15 illustrates a comparison of assembly 1300 and combined input and output cycloidal disc 1400.

As illustrated, disc 1400 includes an outer diameter OD1, while assembly 1300 includes an outer diameter OD2. As one advantage of disc 1400, outer diameter OD1 may be less than outer diameter OD2. This reduction in outer diameter OD1 compared to OD2 may be as a result of the elimination of mounting apertures 1393 from disc 1400, as apertures 1393 are unnecessary in disc 1400.

Additionally, with respect to assembly 1300, tie plate 1319 may be a thin diaphragm. Tie plate 1319 may be thin and wide (radially) to reduce weight, unbalance torque, and create space for installing fasteners to connect tie plate 1319 input cycloidal disc 1318 and output cycloidal disc 1324.

However, tie plate 1319's surface friction with input cycloidal disc 1318 (on an input end) and output cycloidal disc 1324 (on an output end) may not be great enough to transfer high torque load (a high percentage of load is transferred by small fasteners). This high torque load may cause deformation in at least one fastener aperture 1382A and at least one fastener aperture 1383A because of the high concentration of local stress at those locations.

Additionally, when assembled in a circular wave drive (not shown), assembly 1300 is subjected to eccentric movement, cyclic load, and vibration, all of which may result in loosened fasteners connecting tie plate 1319 to input cycloidal disc 1318 and output cycloidal disc 1324. The loosening of these fasteners may result in a loss of motion in the circular wave drive due to relative movement between input cycloidal disc 1318 and output cycloidal disc 1324, and/or fasteners interfering with the movement of gears due to loosening or total dislodgement.

With respect to disc 1400, disc 1400 may be monolithic and thus require no assembly. Fasteners are eliminated from disc 1400, and as such the loosening of the fasteners does not create a risk of loss of motion in a circular wave drive using in disc 1400.

By eliminating the tie plate, disc 1400 may be made more robust than assembly 1300, resulting in a longer possible lifetime of disc 1400.

The reduced outer diameter OD1 of disc 1400 may result in a smaller moment of inertia in disc 1400 as compared to assembly 1300.

Figure 16:
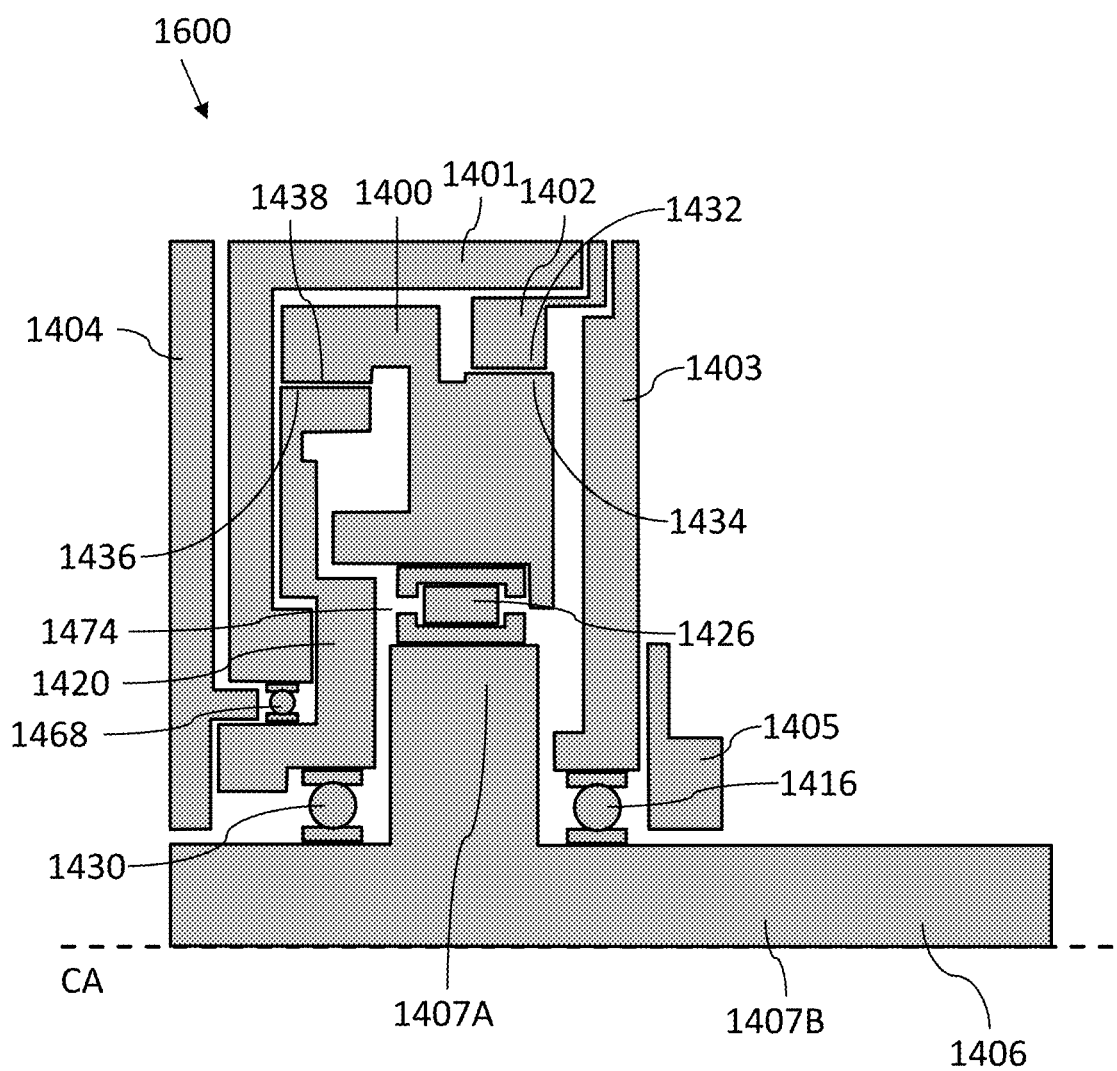
FIG. 16 is a partial sectional view of a circular wave drive 1600 including a combined input and output cycloidal disc 1400.

FIG. 16 illustrates a circular wave drive 1600 including a combined input and output cycloidal disc 1400. Circular wave drive 1600 is illustrated in a partial sectional view, terminating at a central axis CA of an eccentric motion generator 1406. It is understood that the half of circular wave drive 1600 not illustrated is substantially similar to the half of circular wave drive 1600 that is illustrated. Circular wave drive 1600 may include a housing 1401, an input ring gear 1402 (input ring gear 1402 may include input ring gear teeth 1432 about its internal periphery) mounted to housing 1401, an eccentric motion generator 1406 having an eccentric portion 1407A and a non-eccentric portion 1407B, a combined input and output cycloidal disc 1400, a primary drive gear 1420, an eccentric motion generator bearing 1416, an eccentric motion generator/input cycloidal disc bearing 1426, and an eccentric motion generator/output drive element bearing 1430. Circular wave drive 1600 may include an end plate 1403, and a flange plate 1405 connected to end plate 1403.

Circular wave drive 1600 may include an output drive element 1404, connected directly to primary drive gear 1420. Rotation of primary drive gear 1420 may cause rotation of output drive element 1404, and the two may be configured to rotate relative to housing 1401 via primary drive gear/housing bearing 1468. Primary drive gear 1420 may include external primary drive gear teeth 1436 about its external periphery.

Combined input and output cycloidal disc 1400 may include external input cycloidal gear teeth 1434 and internal output cycloidal teeth 1438. Disc 1400 may include a hollow center portion 1474, such that disc 1400 is in the shape of an annulus. Eccentric motion generator 1406 may extend through hollow center portion 1474.

When assembled in circular wave drive 1600, input ring gear teeth 1432 engage input cycloidal gear teeth 1434, and via this tooth engagement and the eccentric motion of disc 1400 (imparted via its engagement with eccentric portion 1407A of eccentric motion generator 1406), input ring gear 1402 and disc 1400 rotate relative to one another about an axis parallel to the axis of rotation of eccentric motion generator 1406 (specifically, the axis of rotation of non-eccentric portion 1407B).

When assembled in circular wave drive 1600, primary drive gear 1420's external primary drive gear teeth 1436 engage internal output cycloidal teeth 1438, and via this tooth engagement and the eccentric motion of disc 1400 (imparted via its engagement with eccentric portion 1407A of eccentric motion generator 1406), primary drive gear 1420 rotates relative to disc 1400 about an axis parallel to the axis of rotation of eccentric motion generator 1406 (specifically, the axis of rotation of non-eccentric portion 1407B).

Via the aforementioned tooth engagements, rotation of eccentric motion generator 1406 causes disc 1400 to rotate. The rotation of disc 1400 causes primary drive gear 1420 to rotate, and this rotation of primary drive gear 1420 causes output drive element 1404 to rotate as the two are connected directly to one another via at least one fastener.

Stated differently, in practice, a rotational force may be input to eccentric motion generator 1406, which may cause rotation of eccentric motion generator 1406 and eccentric portion 1407A. Eccentric motion generator 1406 may be permitted to rotate within end plate 1403 via eccentric motion generator bearing 1416. Eccentric portion 1407A of eccentric motion generator 1406 may engage disc 1400 via eccentric motion generator/input cycloidal disc bearing 1426, which eccentric rotation may cause disc 1400 to engage and rotate along input ring gear teeth 1432. Eccentric rotation disc 1400 may cause primary drive gear 1420 to engage and rotate along disc 1400. Rotation of primary drive gear 1420 may cause rotation of output drive element 1404, and the two may be configured to rotate relative to housing 1401 via primary drive gear/housing bearing 1468. The speed of rotation of output drive element 1404 may be reduced relative to the speed of rotation of eccentric motion generator 1406 pursuant to a reduction ratio.

Circular wave drive 1600 may include various seals to allow a lubricant, such as oil, to be contained within its interior to aid in operation and reduction of wear.

The non-eccentric portion 1407B of eccentric motion generator 1406 may be concentric with input ring gear 1402, primary drive gear 1420, and output drive element 1404. Eccentric portion 1407A may be concentric with disc 1400.

Figure 17:
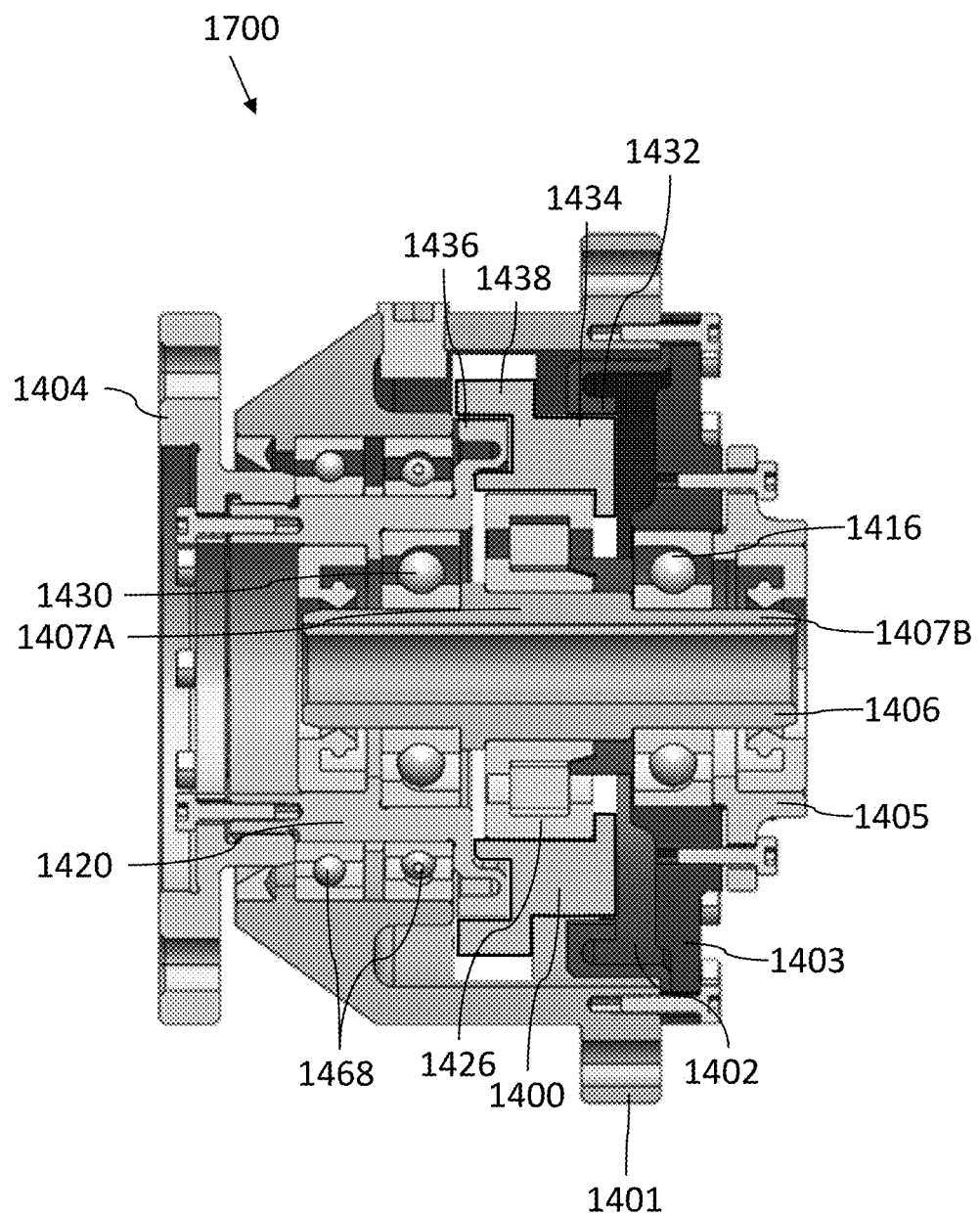
FIG. 17 is a sectional view of a circular wave drive 1700 including a combined input and output cycloidal disc 1400.

FIG. 17 illustrates a circular wave drive 1700 including a combined input and output cycloidal disc 1400. Circular wave drive 1700 may include a housing 1401, an input ring gear 1402 (input ring gear 1402 may include input ring gear teeth 1432 about its internal periphery) mounted to housing 1401, an eccentric motion generator 1406 having an eccentric portion 1407A and a non-eccentric portion 1407B, a combined input and output cycloidal disc 1400, a primary drive gear 1420, an eccentric motion generator bearing 1416, an eccentric motion generator/input cycloidal disc bearing 1426, and an eccentric motion generator/output drive element bearing 1430. Circular wave drive 1700 may include an end plate 1403, and a flange plate 1405 connected to end plate 1403.

Circular wave drive 1700 may include an output drive element 1404, connected directly to primary drive gear 1420. Rotation of primary drive gear 1420 may cause rotation of output drive element 1404, and the two may be configured to rotate relative to housing 1401 via primary drive gear/housing bearing 1468. Primary drive gear 1420 may include external primary drive gear teeth 1436 about its external periphery.

Combined input and output cycloidal disc 1400 may include external input cycloidal gear teeth 1434 and internal output cycloidal teeth 1438. Disc 1400 may include a hollow center portion, such that disc 1400 is in the shape of an annulus. Eccentric motion generator 1406 may extend through the hollow center portion.

When assembled in circular wave drive 1700, input ring gear teeth 1432 engage input cycloidal gear teeth 1434, and via this tooth engagement and the eccentric motion of disc 1400 (imparted via its engagement with eccentric portion 1407A of eccentric motion generator 1406), input ring gear 1402 and disc 1400 rotate relative to one another about an axis parallel to the axis of rotation of eccentric motion generator 1406 (specifically, the axis of rotation of non-eccentric portion 1407B).

When assembled in circular wave drive 1700, primary drive gear 1420's external primary drive gear teeth 1436 engage internal output cycloidal teeth 1438, and via this tooth engagement and the eccentric motion of disc 1400 (imparted via its engagement with eccentric portion 1407A of eccentric motion generator 1406), primary drive gear 1420 rotates relative to disc 1400 about an axis parallel to the axis of rotation of eccentric motion generator 1406 (specifically, the axis of rotation of non-eccentric portion 1407B).

Via the aforementioned tooth engagements, rotation of eccentric motion generator 1406 causes disc 1400 to rotate. The rotation of disc 1400 causes primary drive gear 1420 to rotate, and this rotation of primary drive gear 1420 causes output drive element 1404 to rotate as the two are connected directly to one another via at least one fastener.

Stated differently, in practice, a rotational force may be input to eccentric motion generator 1406, which may cause rotation of eccentric motion generator 1406 and eccentric portion 1407A. Eccentric motion generator 1406 may be permitted to rotate within end plate 1403 via eccentric motion generator bearing 1416. Eccentric portion 1407A of eccentric motion generator 1406 may engage disc 1400 via eccentric motion generator/input cycloidal disc bearing 1426, which eccentric rotation may cause disc 1400 to engage and rotate along input ring gear teeth 1432. Eccentric rotation disc 1400 may cause primary drive gear 1420 to engage and rotate along disc 1400. Rotation of primary drive gear 1420 may cause rotation of output drive element 1404, and the two may be configured to rotate relative to housing 1401 via primary drive gear/housing bearing 1468. The speed of rotation of output drive element 1404 may be reduced relative to the speed of rotation of eccentric motion generator 1406 pursuant to a reduction ratio.

Circular wave drive 1700 may include various seals to allow a lubricant, such as oil, to be contained within its interior to aid in operation and reduction of wear.

The non-eccentric portion 1407B of eccentric motion generator 1406 may be concentric with input ring gear 1402, primary drive gear 1420, and output drive element 1404. Eccentric portion 1407A may be concentric with disc 1400.

It is contemplated that circular wave drives 1600 and 1700 may be used in any of a variety of actuation and/or gear reduction applications, including for example: robotic actuation, mechanical actuation, aerospace actuation, or vehicle transmissions.

The circular wave drives described herein, including for example, circular wave drives 1600 and 1700, may include two or more stages of cycloidal gears. In one aspect, a circular wave drive may include two stages of cycloidal gears. In another aspect, a circular wave drive may include three stages of cycloidal gears. In another aspect, a circular wave drive may include more than two stages of cycloidal gears. In one aspect, a circular wave drive may include two or more stages of cycloidal gears, wherein the two or more stages of cycloidal gears are subtractive. The circular wave drive may include two stages of cycloidal gears, and the two stages may be subtractive. In one aspect, the inclusion of multiple stages of cycloidal gears may permit a circular wave drive to have high reduction ratios. In one aspect, the inclusion of multiple stages of cycloidal gears, wherein the stages are subtractive, may permit a circular wave drive to have high reduction ratios.

The reduction ratio of eccentric motion generator 1406 rotational velocity to output drive element 1404 rotational velocity may be calculated through the following formula:

$$\left[\frac{a}{b}\left(\frac{c-d}{c}\right) - \frac{a-b}{a}\right]^{-1} : 1$$

where a=the number of gear teeth 1432 of input ring gear 1402;
where b=the number of gear teeth 1434 of disc 1400;
where c=the number of gear teeth 1438 of disc 1400; and
where d=the number of gear teeth 1436 of primary drive gear 1420.

Accordingly, where one desires a specific reduction ratio, one may design circular wave drive 1600/1700 such that the number of gear teeth of each of input ring gear 1402, disc 1400, and primary drive gear 1420 effect the desired reduction ratio.

Any of the aforementioned teeth may have any of a variety of gear tooth profiles, including for example, a sinusoidal tooth profile.

In one aspect, circular wave drives 1600 and 1700 are not reverse-drivable, and as such can only be operated in one rotational direction. In another aspect, circular wave drives 1600/1700 are reverse-drivable, and as such can be operated in more than one rotational direction.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11.

As stated above, while the present application has been illustrated by the description of aspects thereof, and while the aspects have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

The invention claimed is:

1. A circular wave drive, comprising:
a compliant input ring gear having an inner surface,
wherein the compliant input ring gear includes internal input ring gear teeth oriented on the inner surface;
an input cycloidal disc having an outer surface,
wherein the input cycloidal disc includes external input cycloidal disc gear teeth oriented on the outer surface, and
wherein the external input cycloidal disc gear teeth at least partially engage the internal input ring gear teeth;
a compliant primary drive gear having an outer surface,
wherein the primary drive gear includes external primary drive gear teeth oriented on the outer surface;
an eccentric motion generator,
wherein the eccentric motion generator includes an eccentric portion and a non-eccentric portion and wherein a centerline of the eccentric portion and the non-eccentric portion are offset from one another, and
wherein the eccentric motion generator includes a hollow central bore; and
an output cycloidal disc having an inner surface,
wherein the output cycloidal disc includes internal output cycloidal disc teeth oriented on the inner surface, and
wherein the internal output cycloidal disc teeth at least partially engage the external primary drive gear teeth.

2. The circular wave drive of claim 1, further comprising an output drive element connected to the primary drive gear.

3. The circular wave drive of claim 1, wherein the input cycloidal disc is connected to the output cycloidal disc.

4. The circular wave drive of claim 1, wherein the eccentric motion generator is rotatably connected to the input cycloidal disc via an eccentric motion generator/input cycloidal disc bearing.

5. The circular wave drive of claim 1, wherein the compliant input ring gear includes a non-compliant portion containing the input ring gear teeth, and an input ring gear mounting flange, wherein the non-compliant portion and the input ring gear mounting flange are connected by a compliant wall.

6. The circular wave drive of claim 5, wherein the compliant wall is separated from the non-compliant portion by a relief groove.

7. The circular wave drive of claim 1, wherein the primary drive gear includes a hub, a compliant wall extending axially and radially outwardly from the hub, and wherein a relief groove separates the external primary drive gear teeth from the compliant radial wall.

8. A circular wave drive, comprising:
a compliant input ring gear having an inner surface,
wherein the compliant input ring gear includes internal input ring gear teeth oriented on the inner surface, and wherein the compliant input ring gear includes a non-compliant portion containing the input ring gear teeth, and an input ring gear mounting flange, wherein the non-compliant portion and the input ring gear mounting flange are connected by a compliant wall;

an input cycloidal disc having an outer surface,
wherein the input cycloidal disc includes external input cycloidal disc gear teeth oriented on the outer surface, and
wherein the external input cycloidal disc gear teeth at least partially engage the internal input ring gear teeth;

a compliant primary drive gear having an outer surface,
wherein the primary drive gear includes external primary drive gear teeth oriented on the outer surface, and
wherein the primary drive gear includes a hub, a compliant wall extending axially and radially outwardly from the hub, and a relief groove, and wherein the relief groove separates the external primary drive gear teeth from the compliant wall;

an eccentric motion generator,
wherein the eccentric motion generator includes an eccentric portion and a non-eccentric portion and wherein a centerline of the eccentric portion and the non-eccentric portion are offset from one another, and
wherein the eccentric motion generator includes a hollow central bore; and an output cycloidal disc having an inner surface,
wherein the output cycloidal disc includes internal output cycloidal disc teeth oriented on the inner surface, and
wherein the internal output cycloidal disc teeth at least partially engage the external primary drive gear teeth.

9. The circular wave drive of claim 8, further comprising an output drive element connected to the primary drive gear.

10. The circular wave drive of claim 8, wherein the input cycloidal disc is connected to the output cycloidal disc.

11. The circular wave drive of claim 8, wherein the eccentric motion generator is rotatably connected to the input cycloidal disc via an eccentric motion generator/input cycloidal disc bearing.

12. The circular wave drive of claim 8, wherein the compliant input ring gear compliant wall is separated from the non-compliant portion by a relief groove.

13. A circular wave drive, comprising:
an input ring gear having an inner surface,
wherein the input ring gear includes internal input ring gear teeth oriented on the inner surface;

a monolithic combined input cycloidal disc and output cycloidal disc comprising:
external input cycloidal gear teeth at least partially engaging the internal input ring gear teeth,
internal output cycloidal gear teeth,
a hollow center portion defined by a radially inner surface including an inner flange, and
a radially inner wall extending radially inwardly from the radially inner surface,
wherein the inner flange is radially inwardly of and axially overlapping with the internal output cycloidal gear teeth;

a primary drive gear having an outer surface,
wherein the primary drive gear includes external primary drive gear teeth oriented on the outer surface and at least partially engaging the internal output cycloidal gear teeth;

an eccentric motion generator,
wherein the eccentric motion generator includes an eccentric portion and a non-eccentric portion and wherein a centerline of the eccentric portion and the non-eccentric portion are offset from one another.

14. The circular wave drive of claim 13, wherein the eccentric motion generator includes a hollow central bore.

15. The circular wave drive of claim 13, wherein the inner flange includes a groove on its radially inner surface, and wherein the groove is configured to engage a retention device.

16. The circular wave drive of claim 13, wherein the combined input cycloidal disc and output cycloidal disc further comprises a clearance gap axially inwardly of the external input cycloidal gear teeth.

17. The circular wave drive of claim 13, wherein the combined input cycloidal disc and output cycloidal disc further comprises a clearance gap axially inwardly of the internal output cycloidal gear teeth.

18. The circular wave drive of claim 13, further comprising an output drive element connected to the primary drive gear.

19. The circular wave drive of claim 13, wherein the eccentric motion generator is rotatably connected to the combined input cycloidal disc and output cycloidal disc via an eccentric motion generator/input cycloidal disc bearing.

\* \* \* \* \*